United States Patent [19]

Reynolds et al.

[11] Patent Number: 4,882,764

[45] **Date of Patent: * Nov. 21, 1989**

[54] CUTOFF CONTROL SYSTEM

[75] Inventors: Bruce A. Reynolds, Sussex; Alexander Brengauz, Whitefish Bay, both of Wis.

[73] Assignee: Quad/Tech, Inc., Pewaukee, Wis.

[ * ] Notice: The portion of the term of this patent subsequent to Apr. 5, 2005 has been disclaimed.

[21] Appl. No.: 146,619

[22] Filed: Jan. 21, 1988

Related U.S. Application Data

[62] Division of Ser. No. 717,751, Mar. 29, 1985, Pat. No. 4,736,446.

[51] Int. Cl.[4] ...... G06K 9/00

[52] U.S. Cl. ...... 382/8; 250/571; 382/34; 382/42

[58] Field of Search ...... 382/1, 8, 34, 50, 42; 250/571, 559; 364/565, 569, 571, 469; 400/611; 226/17, 24; 209/583

[56] References Cited

U.S. PATENT DOCUMENTS

| | | | |
|---|---|---|---|
| 2,576,529 | 11/1951 | McKenney | 101/181 |
| 3,872,434 | 3/1975 | DuVall | 382/8 |
| 3,922,539 | 11/1975 | Carnes | 250/571 |
| 4,243,925 | 1/1981 | Gnuechtel | 250/548 |
| 4,449,240 | 5/1984 | Yoshida | 382/34 |
| 4,512,256 | 4/1985 | Schriber | 101/248 |
| 4,532,596 | 7/1985 | Pugsley | 364/469 |
| 4,541,337 | 9/1985 | Schaul | 101/181 |
| 4,561,103 | 12/1985 | Horiguchi et al. | 382/34 |
| 4,677,680 | 6/1987 | Harima et al. | 382/34 |
| 4,685,139 | 8/1987 | Masuda et al. | 382/34 |
| 4,719,575 | 1/1988 | Gnuechtel | 364/469 |
| 4,736,446 | 4/1988 | Reynolds et al. | 382/8 |

FOREIGN PATENT DOCUMENTS

| | | |
|---|---|---|
| 84104516 | 4/1984 | European Pat. Off. . |
| 1075199 | 2/1957 | Fed. Rep. of Germany . |
| 1292420 | 4/1969 | Fed. Rep. of Germany . |
| 2344819 | 1/1975 | Fed. Rep. of Germany . |
| 263481A | 3/1978 | Fed. Rep. of Germany . |
| 1041804 | 6/1953 | France . |
| 58-205766 | 11/1983 | Japan . |

OTHER PUBLICATIONS

Descriptive brochure entitled, "Register Guidance System III from Quad/Tech, Fulley Automated Register Control", produced by Quad/Tech.

Descriptive brochure entitled, "Quad/Tech Register Guidance System III", produced by Quad/Tech.

A Photocopy of a brochure entitled, "Quad/Tech Cutoff Control".

*Primary Examiner*—Leo H. Boudreau
*Assistant Examiner*—Joseph Mancuso
*Attorney, Agent, or Firm*—Foley & Lardner

[57] ABSTRACT

A system for controlling an apparatus operating on a moving web, in accordance with a periodic characteristic of the web. Indicia of successive periods of the characteristics are generated and compared to generate control signals to the apparatus. Specifically, a cutoff control system for a web-fed printing press is disclosed wherein the effective position of the cutting apparatus along the weg path is varied in accordance with variation in the position of a maximum density change in an individual repetitive image from that of a reference image, or in accordance with a cross-correlation between the individual image and a reference image.

20 Claims, 29 Drawing Sheets

PAGE (1)

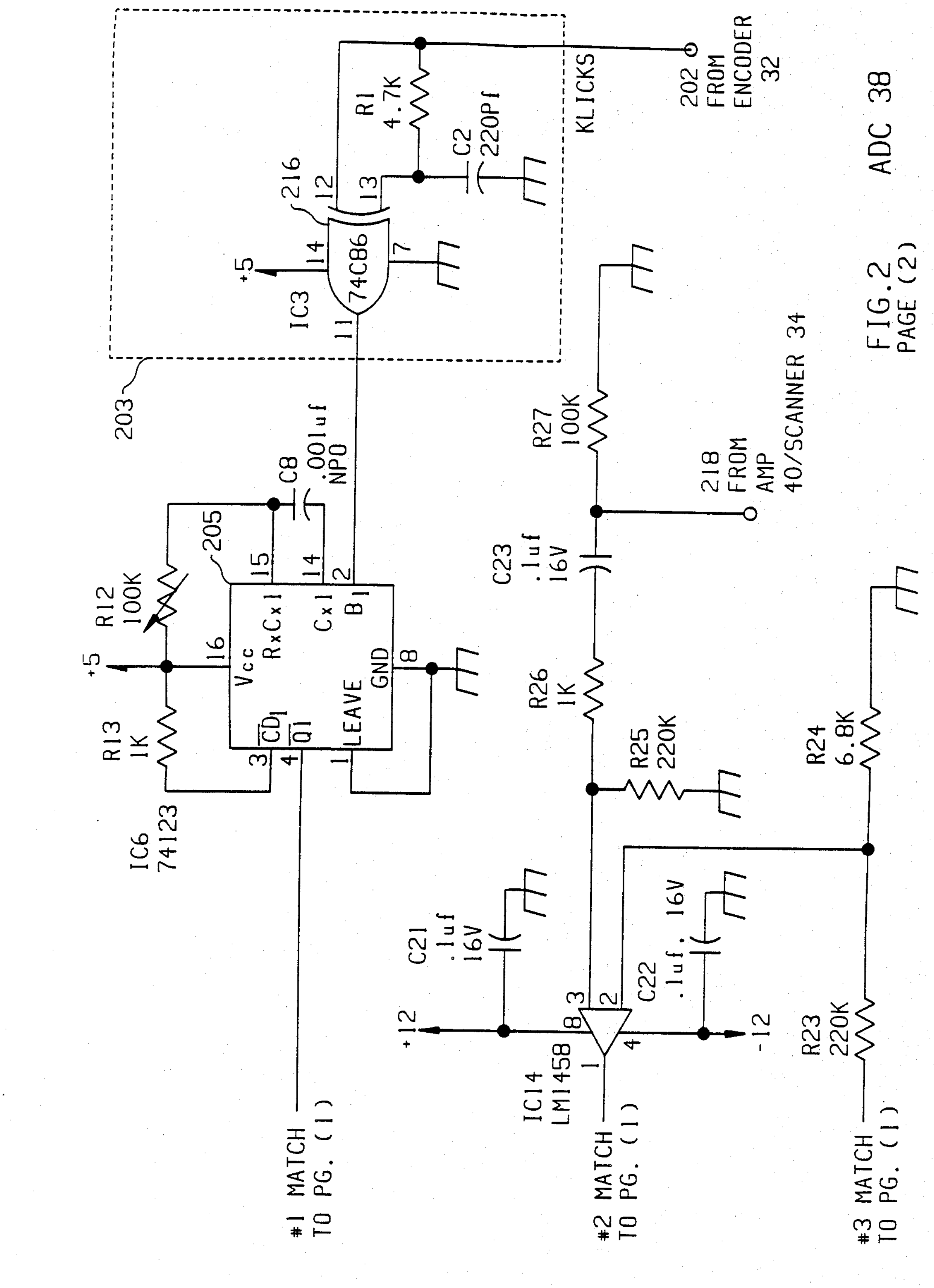
FIG.2 PAGE (2)

PAGE (1)

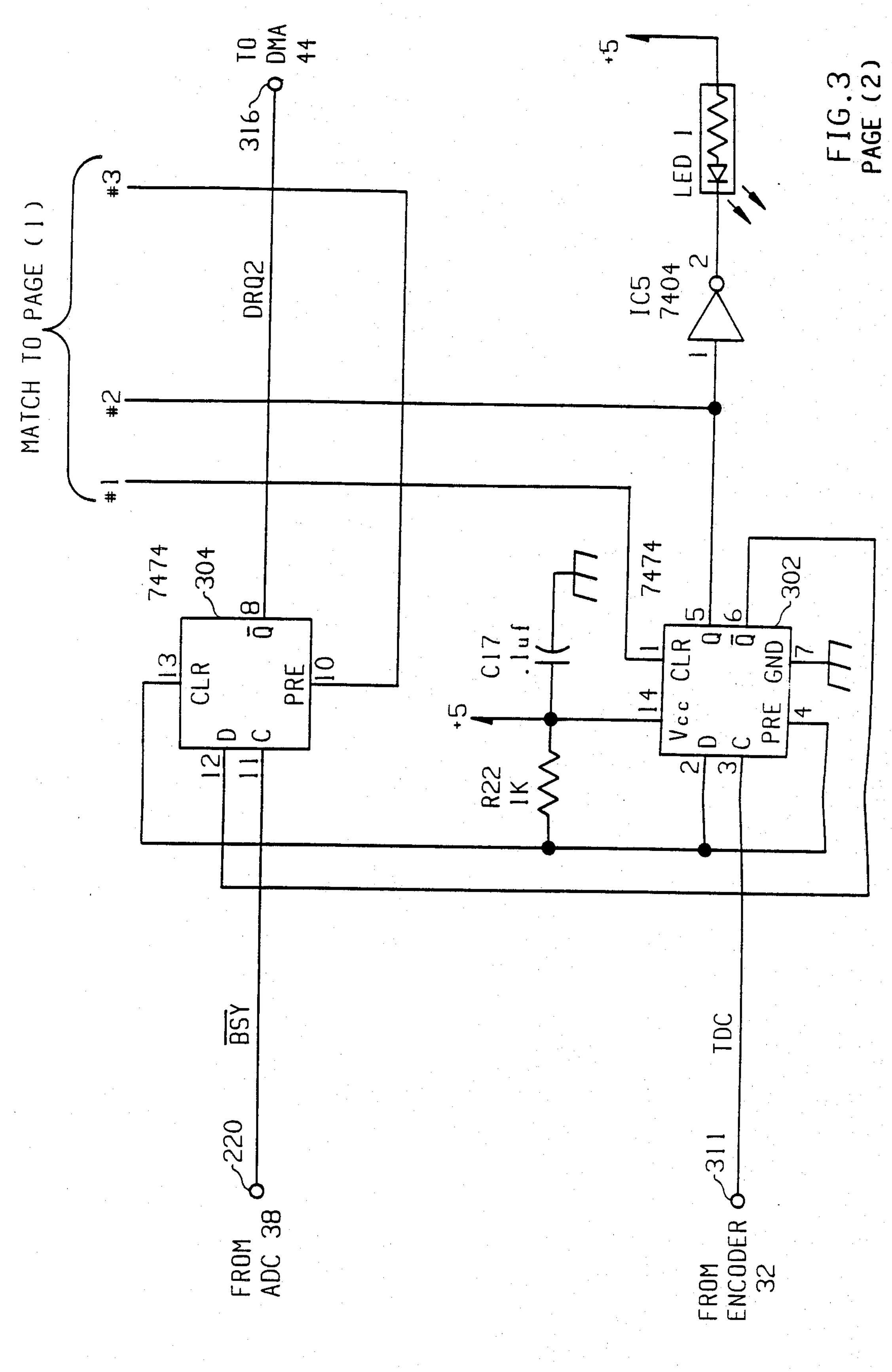
FIG. 3 PAGE (2)

PAGE 1

PAGE 2

PAGE 3

PAGE 4

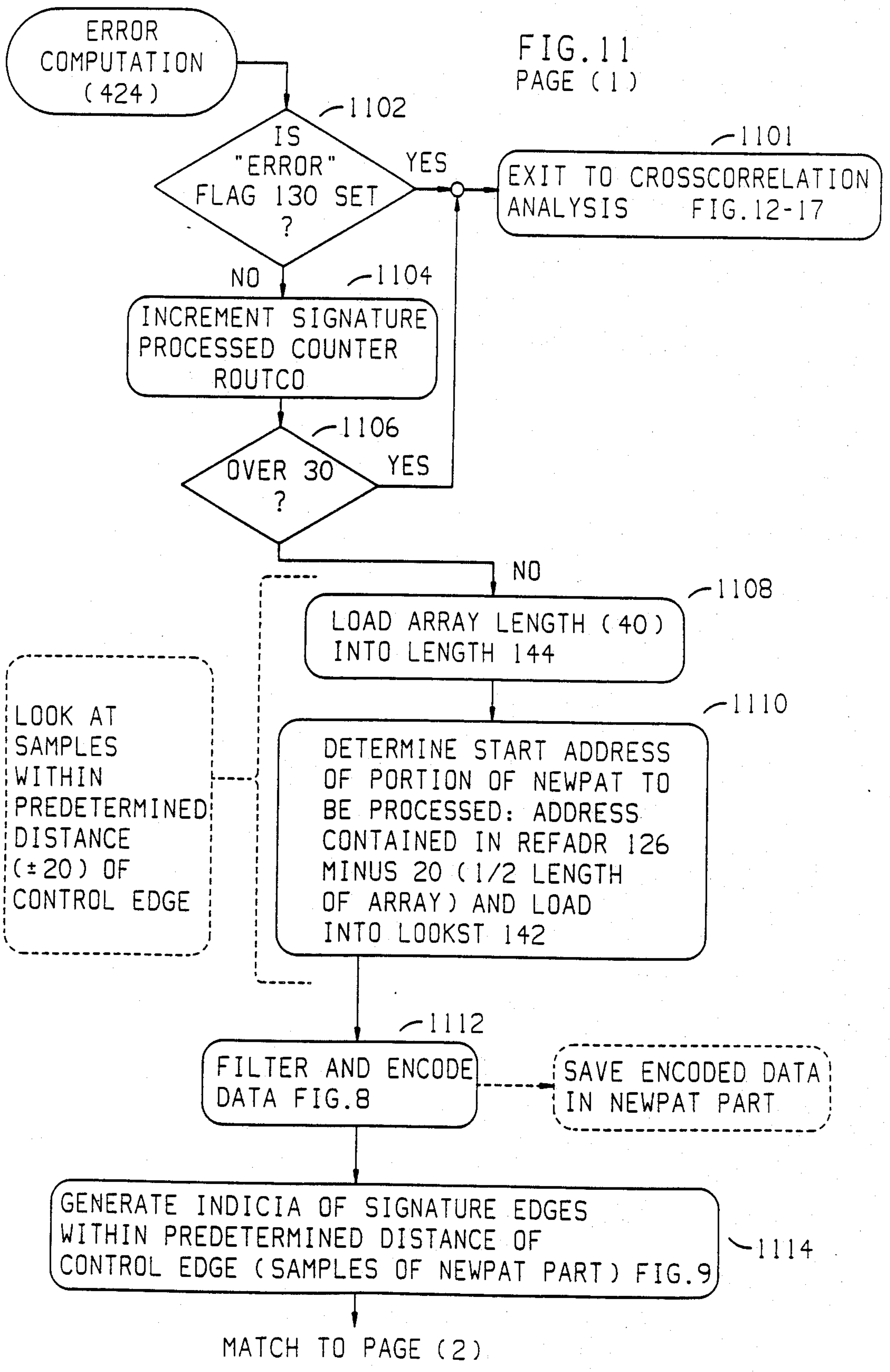
ERROR COMPUTATION (424)
FIG.11
PAGE (1)
1102
IS "ERROR" FLAG 130 SET ?
YES
1101
EXIT TO CROSSCORRELATION ANALYSIS FIG.12-17
NO
1104
INCREMENT SIGNATURE PROCESSED COUNTER ROUTCO
1106
OVER 30 ?
YES
NO
1108
LOAD ARRAY LENGTH (40) INTO LENGTH 144
1110
LOOK AT SAMPLES WITHIN PREDETERMINED DISTANCE (±20) OF CONTROL EDGE
DETERMINE START ADDRESS OF PORTION OF NEWPAT TO BE PROCESSED: ADDRESS CONTAINED IN REFADR 126 MINUS 20 (1/2 LENGTH OF ARRAY) AND LOAD INTO LOOKST 142
1112
FILTER AND ENCODE DATA FIG.8
SAVE ENCODED DATA IN NEWPAT PART
GENERATE INDICIA OF SIGNATURE EDGES WITHIN PREDETERMINED DISTANCE OF CONTROL EDGE (SAMPLES OF NEWPAT PART) FIG.9
1114
MATCH TO PAGE (2)

PAGE (2)

PAGE (1)

MATCH TO PAGE (2)

MATCH TO PAGE (1)

PAGE (2)

PAGE (1)

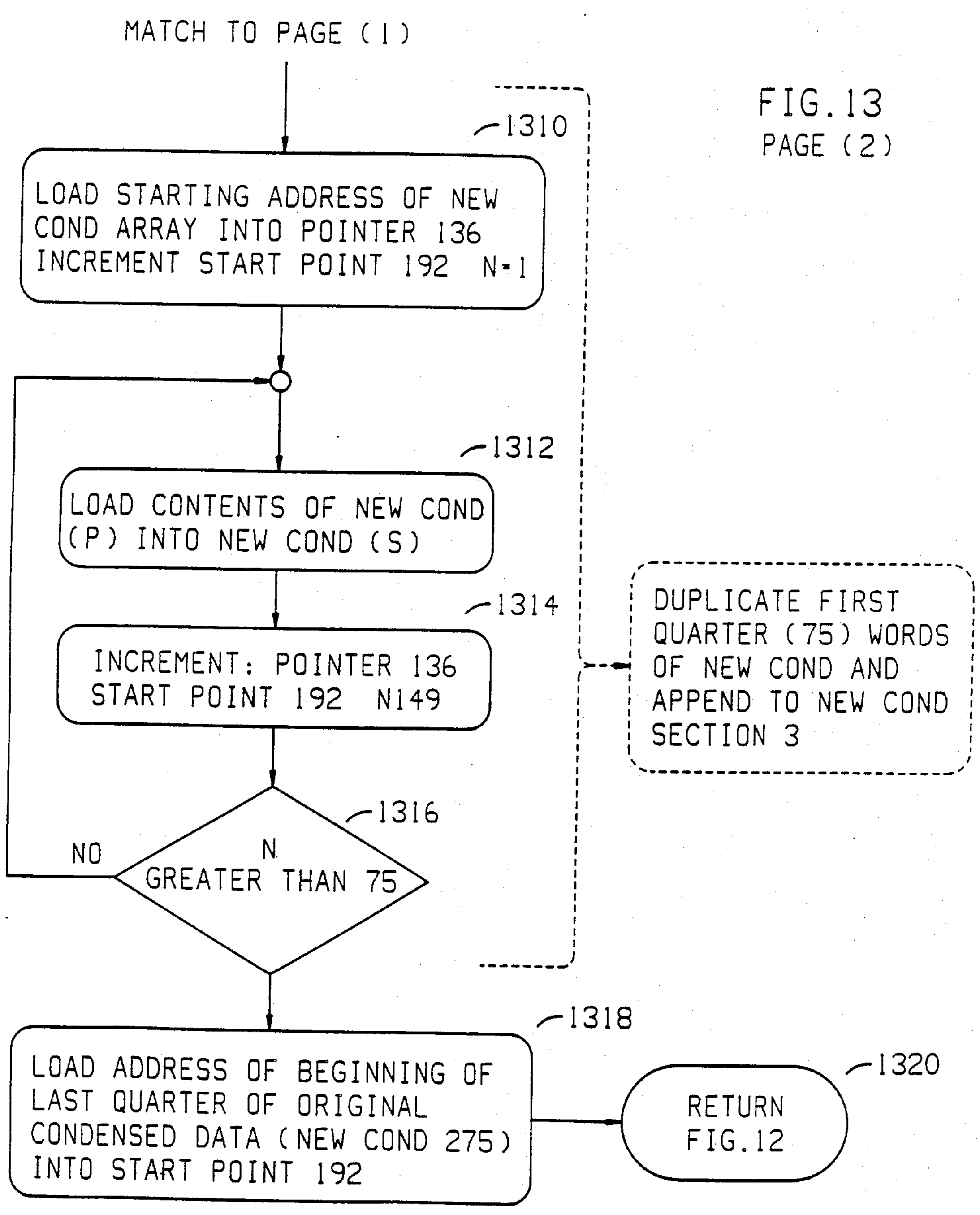
FIG.13 PAGE (2)

PAGE (1)

PAGE (2)

CUTOFF CONTROL SYSTEM

BACKGROUND OF THE INVENTION

The present invention relates to a system for precisely relating a machine operation to the position of images on a moving web, and, particularly, to a system for precisely relating a cutoff operation to images on a moving web in a web-fed printing press system.

In a web-fed printing press, a web of material, typically paper, is fed from a storage mechanism, such as a reel stand, to one or more printing units which imprint the web with images (signatures). The imprinted web is then typically driven through respective processing units such as a dryer unit and/or coating equipment. The web is then fed to a cutting apparatus for separating the respective repeating signatures on the web. The cutting apparatus typically comprises a pair of cooperating cutting cylinders bearing one or more cutting blades. The cutting cylinders are rotated in synchronism with the printing units so that the blades intersect the moving web at predetermined points, e.g., between the repeating signatures (images). It is necessary that the cutting blade intersect the moving web on a repetitive basis in precise coordinated relationship with the repetition of the imprinted signatures on the web. However, various conditions of the printing system, such as, for example, web tension, splices and influence from folders, slitters, imprinters, gluers and other processing equipment cause the linear position of the web, and thus the signatures, to vary over time with respect to the cutting apparatus. Accordingly, it is necessary to periodically adjust the positional relationship of the web and cutting mechanism by advancing or retarding the linear position of the web with respect to the cutting apparatus.

Accordingly, an adjustment mechanism is typically provided to vary the linear position of the web relative to the cutting mechanism, i.e., the effective length of the web path from the printing unit to the cutting mechanism. For example, a compensation roller and a pair of cooperating idler rollers are often interposed in the web path upstream of the cutting mechanism. The relative position of the compensation roller with respect to the idler rollers is varied to change the effective length of the web path and thus advance or retard the relative position of the cutting mechanism to the repeating images on the web. A compensation motor is utilized to selectively adjust the position of the compensation roller.

In general, closed loop systems for controlling the adjustment (compensation) mechanism, and thus the linear position of the web image pattern relative to the cutting mechanism, are known. In such systems, an encoder is coupled to the cutting mechanism to provide respective pulses representative of the cutting mechanism operational cycle: a first pulse indicative of a nominal beginning (top dead center (TDC)) of each cutting cycle, and a second sequence of pulses indicative of incremental advances in the cutting cycle (e.g., 2500 incremental pulses per cutting cycle). The operator initializes the system by establishing a "window" of preset width corresponding to the portion of the cutting cycle during which the blade is intended to intersect the web, i.e., a window (capture range) of a length equal to a first predetermined number of incremental pulses, beginning a second predetermined number of incremental pulses after the top dead center pulse (nominal beginning of the cycle).

An optical scanner is disposed over the moving web between the compensation mechanism and the cutting mechanism, and projects a bar of light on the portion of the web instantaneously underlying the scanner. Images on the web reflect varying amounts of light in accordance with the density (darkness) of the image. The scanner receives the reflected light and generates an output signal indicative of the image density. The density signal is then compared to a reference signal representative of a predetermined threshold density. If a transition from low density (light) to high density (dark) of sufficient magnitude is detected (i.e., the predetermined threshold is crossed), within the predetermined capture range window, the transition point (the number of incremental pulses after top dead center at which the transition occurs) is compared to a count corresponding to the center of the window, and the compensation roller position advanced or retarded accordingly.

Such systems, however, are disadvantageous in that they require the operator to manually align the capture range window with a particular density transition to be monitored (cutmark). In addition, such systems are incapable of discriminating between the desired cutmark and other density transitions on the web which exceed the threshold value. Accordingly, system disruptions can cause conditions whereby the system erroneously locks on a density transition other than the intended cutmark. In such an event, or in the event that the cutmark is not detected within the capture range window, the operator is required to manually override the system (and position the compensation roller to realign the system with the intended cutmark). It is also necessary, in such systems, to maintain alignment between the scanner and the lateral position of the cutmark. Thus, such systems are particularly susceptible to loss of track due to lateral movement of the web, and, further, the position of the scanner must be manually changed in order to accommodate webs of differing widths.

Moreover, choice of a proper threshold level in such systems presents something of a dilemma. If the threshold is not set sufficiently high, the system tends to be susceptible to spurious triggering, and locking on density transitions other than the intended cutmark, and thus, erratic compensation or jitter. Conversely, if the density threshold is set too high, the images upon which the system is capable of operating becomes unduly limited. For example, a high density threshold tends to prevent the system from operating upon images that have not achieved full density. Further, in many instances the images on the web do not provide a density transition which is of sufficient magnitude, sufficiently isolated from other transitions, sufficiently large, and sufficiently linear in disposition to operate as a cutmark. In such cases, the printing of an extraneous cutmark, separate and apart from the image, is required. The extraneous cutmark is typically disposed in the lateral margin of the web, or between successive images. In either case, the use of the extraneous cutmark requires a surrounding clear space on the web and tends to increase wastage.

SUMMARY OF THE INVENTION

The present invention provides a control system not subject to the disadvantages of the prior art. Specifically, the present invention, rather than operating upon a single, specific transition, develops indicia of the entire image signature, and detects recurrence of such signature. Successive images are cross-correlated with a reference pattern to determine linear deviations in the position of the web relative to the cutter, and the web advanced or retarded accordingly.

Thus, a control system in accordance with the present invention avoids the necessity of an extrinsic cutmark, and has a capture range equal to the length of the image (signature), yet is relatively tolerant of spurious transitions, and lateral shift of the web.

BRIEF DESCRIPTION OF THE DRAWINGS

A preferred exemplary embodiment of a control system in accordance with the present invention will hereinafter be described in conjunction with the appended drawing wherein like designations denote like elements, and.

DETAILED DESCRIPTION OF A PREFERRED EXEMPLARY EMBODIMENT

Figure 1:
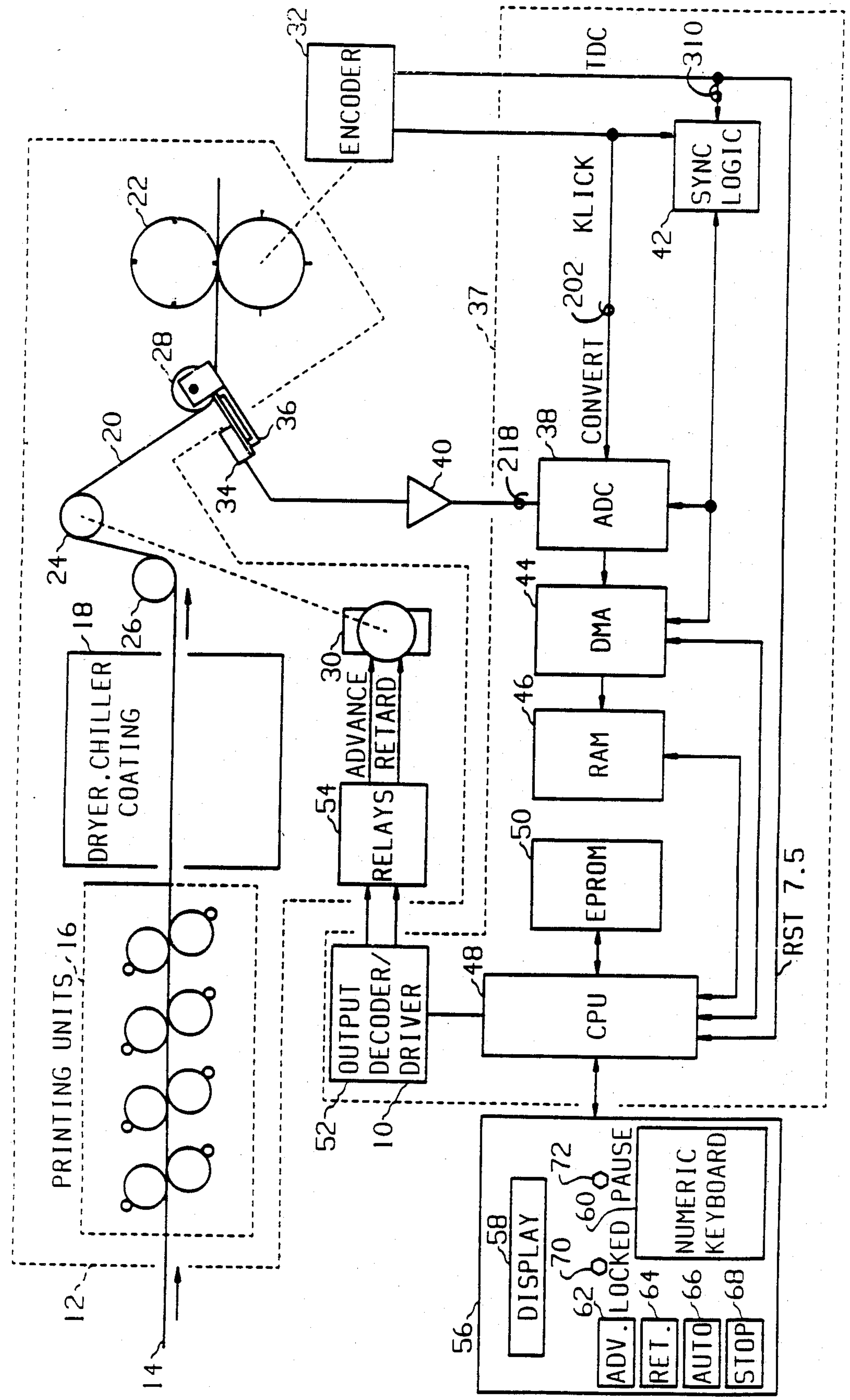
FIGS. 1 and 1*a* is a schematic block diagram of an exemplary control system in accordance with the present invention cooperating with a conventional web-fed printing press.

Referring to FIG. 1, a control system 10 in accordance with the present invention cooperates with a conventional web-fed printing press 12. A web of material 14, such as paper, is fed to printing press 12 from a storage mechanism such as a reel stand (not shown). Web 14 is fed through one or more printing units 16, various processing apparatus 18, and a linear position compensation mechanism 20 to a cutting mechanism 22.

Compensation mechanism 20 suitably comprises a movable compensation roller 24 cooperating with a pair of stationary idler rollers 26 and 28. A compensation motor 30 selectively varies the relative position of compensation roller 24 and idler rollers 26 and 28 to adjust the effective length of the web path from printing unit 16 to cutting mechanism 22, thus advancing or retarding the web relative to cutting mechanism 22.

Cutting mechanism 22 is suitably of the conventional rotating cutting cylinder type. A pair of cooperating cylinders bear one or more blades symmetrically mounted on at least one of the cylinders. The cutting cylinders of cutting mechanism 22 are rotated by means of a conventional drive mechanism (not shown) in synchronism with the operation of printing units 16. As the cutting cylinders rotate, the blades intersect web 14 on a repetitive basis, with a period corresponding to that of printing units 16.

An encoder 32 is operatively coupled to cutting mechanism 22 to generate electrical pulses representative of the cutting mechanism cycle. With respect to each cutting cycle, a first pulse, sometimes referred to herein as a top dead center (TDC) pulse or marker pulse, is generated at an arbitrary point of the operating cycle designated as the nominal beginning, and a sequence of pulses (klicks), indicative of incremental advances in the cutting cycle, e.g., 1,200 pulses at constant intervals throughout 360° of rotation of the cutting cylinder. Encoder 32 may be any suitable commercially available shaft driven optical encoder such as an Encoder Products Company Model No. 716 or Sumtak Model No. LEI-053 optical encoder.

A conventional optical scanner 34, such as a SICK GMBH Model NT6 scanner, is disposed above web 14 between compensation roller 24 and cutting mechanism 22 such that the linear distance along the web path between optical scanner 34 and cutting mechanism 22 is essentially constant during operation of the printer. Thus, the cut position is a constant distance from the instantaneously scanned portion of web 14. Optical scanner 34 is suitably disposed on a bracket 36 removably mounted to idler roller 28. Bracket 36 permits both linear and transverse adjustment of optical scanner 34 in a conventional manner. Optical scanner 34 generates an essentially continuous analog signal (video signal) indicative of the image density of the portion of web 14 instantaneously underlying optical scanner 34.

The analog image-density (video) signals from optical scanner 34 and the respective pulses indicative of the cutter cycle are applied to a data collection and processing unit 37. It is generally desirable to amplify the signals from optical scanner 34 prior to application to data collection and processing unit 37, particularly if data collection and processing unit 37 is disposed at some distance from optical scanner 34. Accordingly, an amplifier 40 may be interposed between optical scanner 34 and data collection and processing unit 37. Amplifier 40 suitably comprises a scanner line driver portion, disposed in the vicinity of optical scanner 34, which amplifies the analog output signal of optical scanner 34 and drives connecting lines with corresponding balanced complementary signals. A scanner line receiver portion of amplifier 40 receives the balanced complementary signals from the line driver portion and converts the signals into a single-ended format for application as the analog input to data collection and processing unit 37. Such an arrangement is particularly advantageous in that balanced differential signals are less susceptible to noise induced by adjacent equipment. The use of balanced differential line drivers and receivers permits ADC 38 and various other electronic components of system 10 to be disposed at distances of as much as several hundred feet from optical scanner 34 without incurring noise problems. If desired, a plurality of optical scanners 34 can be coupled to data collection and processing unit 37 (and thus system 10) on a switched or multiplexed basis, to allow for various web arrangements on a given press. Suitable selection circuitry (not shown) under control of a CPU 48 selectively provides power to the appropriate scanner.

Data collection and processing unit 37 selectively provides control signals to advance and retard relays 54, to thereby control the operation of compensation motor 30, and thus the position of compensation roller 24. Data collection and processing unit 37 suitably comprises analog to digital converter (ADC) circuitry 38, suitable synchronization logic 42, a conventional direct memory access (DMA) device 44, a conventional random access memory (RAM) 46, a conventional central processing unit (CPU) 48, a cooperating electronically programmable read only memory (EPROM) 50 and a conventional output port device 52.

Figure 1A:
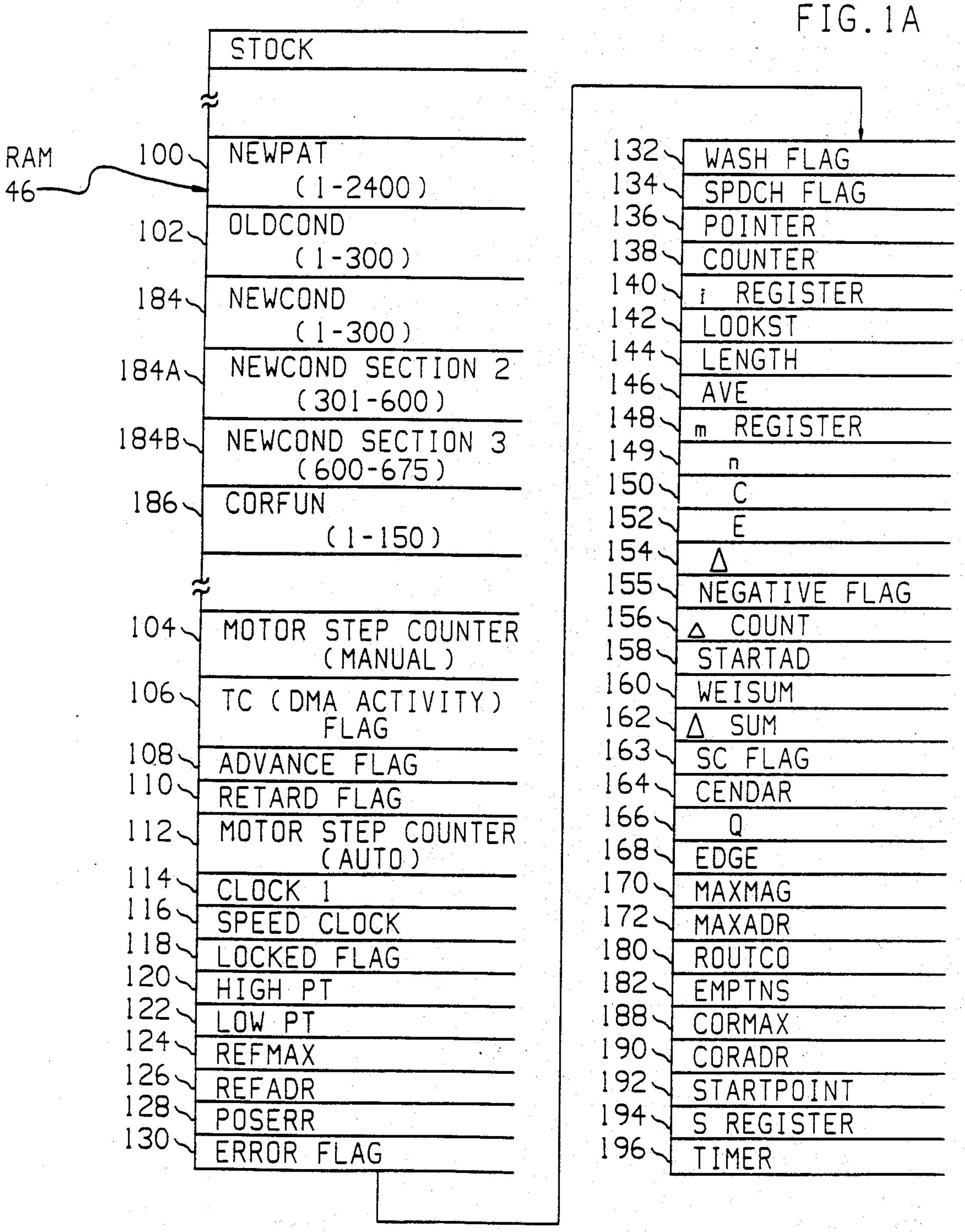

Referring briefly to FIG. 1A, RAM 46 includes a first block (array) 100 of 2,400 sequential addressable locations (sometimes hereinafter referred to as NEWPAT array 100), including at least one addressable location, e.g., byte, corresponding to each sampling point in the cutting mechanism operational cycle, i.e., each digital sample generated by ADC 38. RAM 46 also includes locations dedicated to storage of indicia of a reference pattern (array OLDCOND 102, and HIGHPT 120 and LOWPT 122, REFMAX 124, REFADR 126), indicia of desired motor position corrections (advance and retard flags 108, 110, automatic motor step counter 112, manual motor step counter 104), indicia of system operating parameters (CLOCK1 114, SPDCLK 116) as well as various other processed data, flags, counts and variables generated during the processing and/or system operation as will be explained later.

If desired, CPU 48 may also communicate with other devices such as remote keyboards, other cutoff control systems, diagnostic devices, host computer systems etc. through optically isolated serial communications circuitry (not shown).

Referring again to FIG. 1, a control console 56 provides operator input and monitoring. Console 56 suitably comprises a display 58, a numeric keypad 60, respective advance, retard, automatic and stop control buttons 62, 64, 66 and 68 respectively, and respective indicator lamps (LEDs) 70 and 72. Display 58 is suitably a seven-segment five-digit LED display, and is utilized to show correction values entered through numeric keypad 60 or determined by system 10 during operation. Control console 56 is interfaced to the data collection and processing unit 37 through suitable conventional interfacing circuitry (not shown) such as conventional display driver and input port (tri-state bus driver) circuits.

To manually advance or retard the position of the cut in relation to web 14, a numerical entry corresponding to the desired linear change in the web path is entered through numeric keypad 60 and advance button 62 or retard button 64 depressed to indicate the direction of movement. The numerical entry and advance/retard entry are latched and ultimately applied, by conventional input port circuitry (not shown) in accordance with standard data input interrupt routines, to a data bus for communication to RAM 46. Specifically, referring to FIG. 1A, the appropriate advance flag 108 or retard flag 110 is set, and indicia of the numerical entry loaded into manual motor step counter 104. If the advance button 62 or retard button 64 are depressed in the absence of a numerical entry, a predetermined count, corresponding to a predetermined linear variation in the web path length, suitably 0.002 inch, is loaded into manual motor step counter 104. CPU 48 then generates control signals to output port device 52 to thereby actuate the appropriate relay 54 (and thus energize compensation motor 30) for a predetermined time established by incrementing motor control timer 196 in accordance with an internal clock. Manual motor step counter 104 is then decremented, and the process repeated, until the amount in manual motor step counter 104 reaches zero. Thus, motor 30 is activated and the web path length varied, for a time period corresponding to the count entered in manual motor step counter 104.

When automatic button 66 is depressed, and sensed by CPU 48 through standard input interrupt routines, system 10 enters a pattern recognition mode of operation, and remains in such mode until stop button 68 is depressed. Depression of stop button 68 also halts any corrective movement in process. During pattern recognition mode operation, ADC 38 converts the analog density signals from optical scanner 34 into a sequence of digital bytes (samples), corresponding to the instantaneous value of the video signal from optical scanner 34 at sampling instants determined in accordance with the rising and falling edges of the incremental advance pulses from encoder 32. Synchronization logic 42 and DMA device 44 cooperate to store successive groups of bytes in RAM 46 corresponding to successive image signatures, i.e., the portion of the web 14 passing scanner 34 during one cutting cycle. CPU 48 then processes the data corresponding to successive signatures to derive position off-set data (cutoff error), and generates appropriate output signals to an output port device 52. Output port device 52 responsively generates appropriate command signals to advance and retard relays 54.

Figure 2:
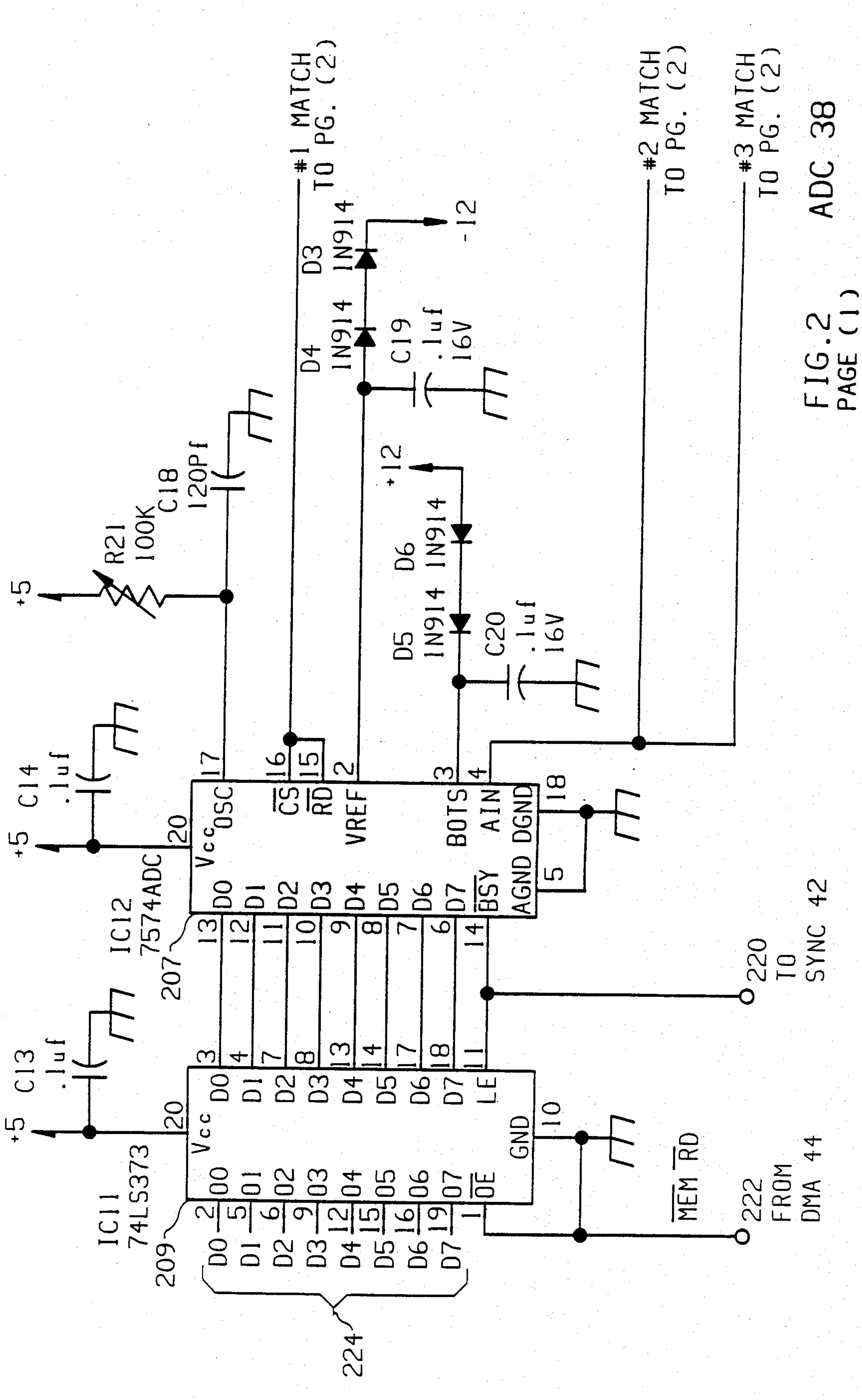
FIG. 2 is a schematic block diagram of a suitable analog to digital converter circuit.

The conversion process by ADC 38, is initiated and synchronized with the cutting cycle by the incremental advance pulses (klicks) from encoder 32. ADC 38 generates at least one byte representing the image density during each incremental advance of the cutting mechanism 22. ADC 38, if desired, can be adapted to sample the analog scanner output at a repetition rate in excess of that of the incremental advance pulses from encoder 32. For example, ADC 38 may include suitable pulse multiplication and pulse shaping circuitry. Referring now to FIG. 2, the incremental advance (klick) pulses from encoder 32 are applied to terminal 202 of ADC 38 to initiate the sampling and conversion process. The incremental pulses (klicks) from encoder 32 are applied to suitable pulse multiplier circuit 203, such as an Exclusive-OR gate 216 (operating as a pulse doubler) which generates a plurality of pulses at constant intervals in response to each incremental pulse from encoder 32. The plurality of pulses are applied, through a suitable pulse shaping circuit, such as monostable multivibrator (one-shot) 205, as a convert command signal to a conventional analog to digital converter (ADC) chip 207, such as a Micro Power Systems 7574 ADC chip, operating upon the video signal from optical scanner 34 (applied at terminal 218).

In operation, pulse multiplier circuit 203 generates respective five microsecond duration pulses corresponding to the leading and trailing edges of the incremental advance pulses. One-shot 205 stretches the duration of respective pulses from five to fifteen microseconds to facilitate operation of ADC chip 207. In response to each of the multiple pulses generated in response to the incremental advance pulse from encoder 32 ADC chip 207 generates a byte of digital data indicative of the instantaneous scanner video output, and upon completion of a conversion operation generates a control signal (BSY/). The BSY/ signal is applied to the latch enable (LE) input of a bus driver (latch) 209, (and, as will be explained, at terminal 220 to synchronization logic 42). In response to the rising edge of the BSY/ control signal, latch 209 captures and stores the byte of digital data from ADC chip 207. Latch 209 selectively communicates the digital word through a data bus 224 to RAM 46, in accordance with a memory ready (MEM RD/) signal from DMA device 44 (applied at terminal 222 as an output enable control signal (OE/)).

As previously noted, DMA device 44 and synchronization logic 42 cooperate to store successive groups of bytes, each group corresponding to an image signature, into predetermined blocks of locations in RAM 46. DMA device 44 is utilized to provide sufficiently rapid data transfer operations in respect of RAM 46. RAM 46, suitably comprising a 8K byte, Hitachi 6164 random access memory chip, stores the bytes of digital data generated by ADC 38.

DMA device 44 suitably comprises an Intel 8257-A DMA controller integrated circuit cooperating with a Texas Instruments 74LS373 bus driver chip. DMA device 44, in effect, permits selective access to the CPU data and address buses (which would normally be under direct control of CPU 48). Upon initialization of the system, CPU 48 provides DMA device 44 with indicia of a starting address in RAM 46 of a block of locations to be operated upon (i.e., NEWPAT array 100), the number (2,400) of bytes to be transferred (number of samples in the image signature) and the direction of data movement (to or from RAM 46). The starting address, byte count, and direction of transfer are maintained in internal address pointer, byte count and direction registers. Thereafter, data transfer into RAM 46 can be provided by DMA device 44 without further involvement of CPU 48, freeing CPU 48 for computation. When access to the buses (and RAM 46) is desired, a control signal (DRQ2) is applied to DMA device 44 by synchronization logic 42, as will be explained. DMA device 44, responsively generates a hold request signal (HRQ) to CPU 48 to obtain control of the data and address buses. Upon acknowledgement by CPU 48 (signified by a hold acknowledgement (HLDA) signal from CPU 48), DMA device 44 generates address and control signals necessary to transfer one byte of data from ADC 38 to RAM 46. The internal address pointer and byte count registers are then incremented and the cycle repeated such that the next successive digital word sample from ADC 38 is stored in the next successive memory location in RAM 46. When the designated number of bytes have been transferred, DMA device 44 generates a transfer complete/terminal count (TC) output signal to synchronization logic 42, as will be explained.

Figure 3:
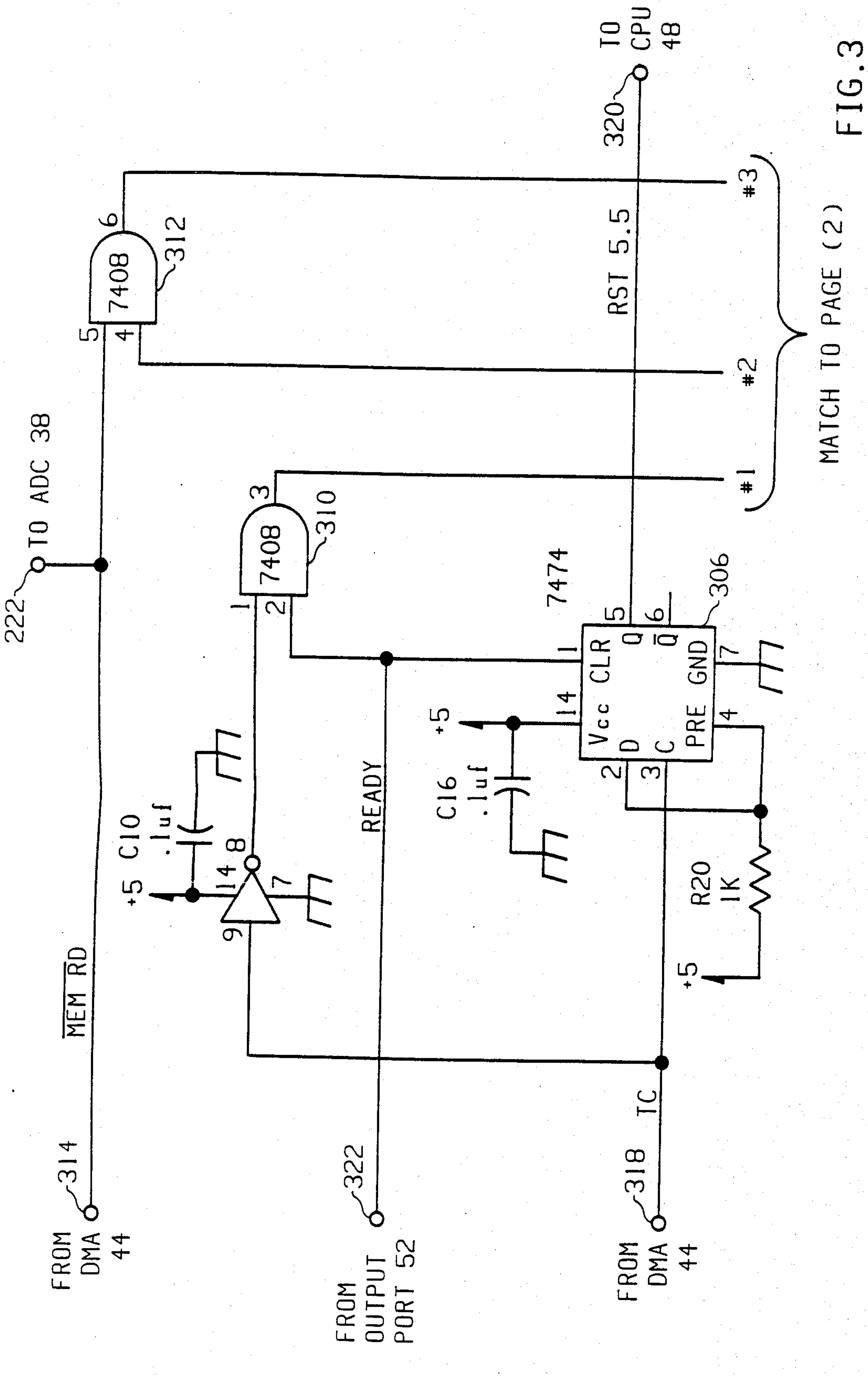
FIG. 3 is a schematic block diagram of suitable synchronization logic.

Synchronization logic 42 coordinates data transfer and CPU 48 operations with the machine cycle of cutting mechanism 22. Suitable synchronization logic 42 is shown in FIG. 3, comprising respective presetable D-type flip-flops (FFs) 302, 304 and 306, suitably Texas Instruments 74LS74 integrated circuits, and respective two input AND gates 310 and 312. Flip-flops 302 and 304 synchronize data transfer operations by DMA device 44 with the operation of the cutting cycle and ADC 38 (FIG. 1). Flip-flop 306 synchronizes the operation of CPU 48 with the collection and transfer of a complete signature of data by DMA device 44.

Referring now to FIGS. 1, 2 and 3, synchronization logic 42 operates as follows. Upon the nominal beginning of the cutting cycle the marker pulse (TDC) from encoder 32 clocks flip-flop 302 (terminal 311), enabling AND gate 312 with respect to the memory ready (MEM RD/) signal from DMA device 44.

As previously noted, ADC chip 207 (FIG. 2) generates the BSY/ command signal to load a digital video sample into bus driver latch 209, i.e., signifying that a data byte is accessible through data bus 224. The rising edge of the BSY/ signal clocks (terminal 220) flip-flop 304, causing the Q/ output (terminal 316) thereof to go high. The Q/ output (terminal 316) is applied to DMA device 44 as the DRQ2 request. DMA device 44 responsively generates a hold request signal (HRQ) to CPU 48.

CPU 48 relinquishes control of data bus 224 and the address bus (not shown) to DMA device 44 and generates a hold acknowledge signal (HLDA) to DMA device 44. DMA device 4 then generates the memory ready control signal (MEM RD/) which is applied through AND gate 312 to the preset terminal (PRE) of flip-flop 304 causing the Q/ output thereof (terminal 16) to go low, cancelling the DMA device 44 request The memory ready signal (MEM RD/) is also applied to the output enable (OE) terminal (terminal 222) of bus driver latch 209 (FIG. 2) to place the data byte on data bus 224 for transfer into the location of RAM 46 designated by the internal address pointer of DMA device 44. DMA device 44 then increments the internal byte counter and memory address pointer.

The direct memory accessing storage cycle just described is repeated in response to each data conversion by ADC chip 207 (each BSY/ signal), until the preset number of bytes initially stored in the internal byte counter of DMA device 44 (the number of bytes comprising a complete image signature) is reached.

After 2,400 iterations, a complete image signature has been transferred into RAM 46, the internal counter reaches zero and DMA device 44 generates a transfer complete/terminal count (TC) signal. The leading edge of the terminal count (TC) pulse clocks flip-flop 306, latching the TC indication into a steady state as required by CPU 48 for application as interrupt signal RST55. The trailing edge of the TC pulse is also propagated through AND gate 310 to clear flip-flop 302, initializing the flip-flops for the next top dead center pulse from encoder 32.

The RST5.5 interrupt signal advises CPU 48 that a full load of data, i.e., data representing a complete image signature, has been placed in RAM 46 and is available for processing. CPU 48 then causes output port device 52 to alter the state of the ready signal at terminal 322, clearing flip-flop 306 in preparation for collection of the data from the next sampled image.

As will be more fully described in conjunction with the FIGS. 4 through 18, CPU 48 processes the image signature data in RAM 46 in accordance with a program contained in EPROM 50. In essence, during pattern recognition mode operation, CPU 48 develops indicia of a reference pattern, then analyzes subsequent signatures against the reference pattern to determine whether there is any linear deviation from the reference pattern. If it is determined that an error in web position exists, indicia of the magnitude of the error is displayed on display 58, and appropriate signals are generated to output port device 52 to effect corrective action. Output port device 52 energizes an appropriate optically coupled relay 54 for a length of time necessary to return web 14 to its desired linear position..

As will hereinafter be explained in conjunction with FIGS. 11 through 17, system 10 utilizes two alternative procedures for determining positional error: a first procedure which provides positive assurance that the new pattern corresponds to the reference pattern, but which requires a relatively substantial processing time, and a second procedure which provides a fast and accurate determination of positional deviation of the new pattern, but which, while not so susceptible to "false locking" as the prior art, is capable of false locking under certain circumstances. The respective procedures are selectively used on a predetermined alternative basis to ensure against any significant positional error.

The first procedure (performed on a periodic basis or when error conditions are detected in a preceding signature), involves cross-correlating new signature data with the reference pattern, and comparing the results of the cross-correlation with an auto-correlation function of the reference pattern.

The high resolution procedure involves the definition of a particular control edge (change in image density and detecting changes in position of that edge as it occurs in the successive images on web 14.

More specifically, with reference to FIGS. 1 through 4, EPROM 50 includes indicia of respective program steps which are executed in a predetermined order by CPU 48. Upon entering the automatic mode, an initialization of the various components of system 10 is initially effected (step 404). The initialization would include such things as clearing RAM 46, performing a check procedure on EPROM 50 to ensure proper operation, clearing various flags and registers utilized in the process, ensuring that the motor is stopped and initializing communication circuitry.

After initialization, the main operating loop of the procedure is entered. Movement of web 14 is monitored (step 406), suitably by determining whether encoder 32 is generating pulses at a sufficient repetition rate. If web 14 movement is below a preset threshold value, the pattern recognition mode process, and in particular, any movement of compensation motor 30 being effected, or to be effected, by the automatic mode process, is aborted (step 408), and monitoring of the web movement is continued. Manual control of compensation motor 30 via console 56, is, however, permitted even in the absence of web movement.

Assuming sufficient web movement is detected, DMA device 44 is initialized (step 410) and a TC (DMA activity) flag 106 is cleared. More specifically, a count (terminal count) corresponding to the number of samples (2,400) in a complete image signature, the starting address of the block of RAM 46 locations, i.e., new pattern (NEWPAT) array 100, into which the data is to be loaded and various mode control data are loaded into respective registers (not shown) internal to DMA device 44. Appropriate indicators on console 56 are then set (step 412) in accordance with conventional techniques.

The operational status of compensation motor 30 is then determined (step 414). More specifically, the contents of advance flag 108, retard flag 110, manual motor step counter 104, and automatic motor step counter 112 are examined for non-zero content. If each of flags 108 and 110 and automatic motor step counter 112 maintain zero content, then it is indicated that no motor activity is current or posted.

After it has been determined that there is no current or posted motor activity, the ready signal (terminal 322, FIG. 3) assumes a high state (step 416) to, in effect, enable synchronization logic 42 with respect to the next occurrence of the top dead center pulse from encoder 32 (terminal 311). As will be explained, the ready signal maintains a high level until brought low by CPU 48 upon receipt of a terminal count interrupt (RST5.5, terminal 320) signifying collection of a complete signature of data.

After the ready signal has enabled synchronization logic 42, occurrence of the next top dead center (TDC) pulse from encoder 32 (terminal 311) clocks flip-flop 302, enabling flip-flop 304 with respect to the conversion-complete signals BSY/ (terminal 220) from ADC 38. The top dead center (TDC) pulse from encoder 32 is also applied as an interrupt (RST7.5) to CPU 48 (step not shown in FIG. 4).

In response to the top dead center interrupt (RST7.5), CPU 48 transfers the contents of the CLOCK1 counter 114 of RAM 46 (maintaining a count indicative of the period of the cutting cycle, i.e., between top dead center pulses) into the speedclock (SPDCLK) register 116, clears CLOCK1 counter 114, and begins incrementing CLOCK1 counter 114 to accumulate a count indicative of the period of the present machine cycle.

Flip-flop 304 responsively generates the direct access request DRQ2 (terminal 316) to DMA device 44. DMA device 44 in turn, loads the contents of latch 209 of ADC 38 via data bus 224 into the first location in the NEWPAT array 100 of RAM 46. The process is continued with successive samples being loaded into successive locations in NEWPAT array 100 of RAM 46 until samples corresponding to the entire signature (2,400 samples) have been taken and loaded into RAM 46. DMA device 44 then generates the transfer complete/-terminal count (TC) signal (terminal 318). The terminal count (TC) signal clocks flip-flop 306, causing the RST5.5 interrupt signal (terminal 320) to CPU 48 to assume a high level. Upon receipt of the RST5.5 interrupt signal (terminal 320) CPU 48 sets the TC (DMA activity) flag 106 in RAM 46, signifying that DMA device 44 has completed the transfer of data representative of a complete signature into RAM 46, i.e., NEWPAT array 100 has been filled. Thus, until such time as DMA activity flag 106 assumes a high value, indicative that a complete signature of data is resident in NEWPAT array 100 in RAM 46, steps 412, 414 and 416 are repeated.

When DMA activity flag 106 assumes a high level, CPU 48 causes the ready signal (terminal 322) to assume a low level (step 419) thereby inhibiting synchronization logic 42 until after any necessary adjustment of compensation motor 30 is completed.

After a complete signature of data is collected in NEWPAT array 100, locked flag 118 is tested (step 420) to determine whether a reference pattern has previously been acquired, or whether the signature resident in NEWPAT array 100 is to be utilized as the reference pattern. If locked flag 118 is low, indicating that system 10 has not yet acquired a reference pattern, a reference acquisition routine (step 422) is executed. In essence, reference acquisition routine 422 operates upon the data in NEWPAT array 100, and derives and stores appropriate indicia of a reference pattern. Reference acquisition routine 422 will be hereinafter more fully described in conjunction with FIGS. 5 through 10A. If the locked flag 118 is high, indicating that a reference pattern has already been established, an error computation routine (step 424) is executed to generate indicia of the linear deviation of the present signature (represented in NEWPAT array 100) from the previously acquired reference pattern. Error computation routine 424 will hereinafter be more fully described in conjunction with FIGS. 11 through 17.

After reference acquisition routine 422 or error computation routine 424 has been executed, various checks (step 426) are made to ensure against suspect conditions. More specifically, as previously noted, RAM 46 includes respective flags: ERROR 130, WASH 132, and SPDCH 134. If any of the ERROR, WASH or SPDCH flags is set, pause lamp 72 in console 56 is turned on (step 428), all automatic mode process initiated motor moves are aborted and inhibited (step 408), and the process resumes the main loop at web movement monitoring step 406.

As will hereafter be explained, error flag 130 and wash flag 132 are set whenever certain suspect data conditions are detected during processing. Error flag 130 is utilized to indicate that a signature does not include sufficiently large changes in image density. Wash flag 132 is utilized to indicate the occurrence of a blanket wash procedure (a procedure whereby residue accumulated over the course of the printing operation is cleaned from printing units 16), resulting in a temporarily unacceptable image. The wash flag 132 is set when a predetermined number of successive signatures fail to exhibit changes in density above a predetermined level, or if the computed positional error is larger than a predetermined value.

The speedchange flag 134 is used to signify changes in the speed of cutting mechanism 22 (typically in synchronism with web 14). More specifically, CLOCK1 counter 114 (FIG. 1A) is utilized to determine the interval between successive top dead center (TDC) pulses, i.e., the machine cycle period. CLOCK1 counter 114 is incremented in accordance with an internal clock during the interval between top dead center pulses (applied to CPU 48 as an RST7.5 interrupt signal, not shown). If the contents of CLOCK1 counter 114 are outside predetermined threshold levels, or vary significantly from the interval of the previous cycle (represented in the speedclock (SPDCLK) register 116), speedchange flag 134 is set.

If none of the error, wash or speedchange flags 130, 132 and 134 have been set, a motor control routine (step 430) is initiated. In general, indicia of position error generated by error computation routine 424 is loaded into automatic motor step counter 112. Control signals are generated and applied through output port device 52, and suitable interfacing circuitry (not shown) to activate the appropriate relay 54 for a time period corresponding to the contents of automatic motor step counter 112. Relays 54 effect operation of compensation motor 30 to vary the linear web path length between printing units 16 and automatic cutting mechanism 22 accordingly, and the system resumes the main loop at web movement monitoring step 406. Motor control routine 430 will hereinafter be more fully described in conjunction with FIG. 18.

Figure 5:
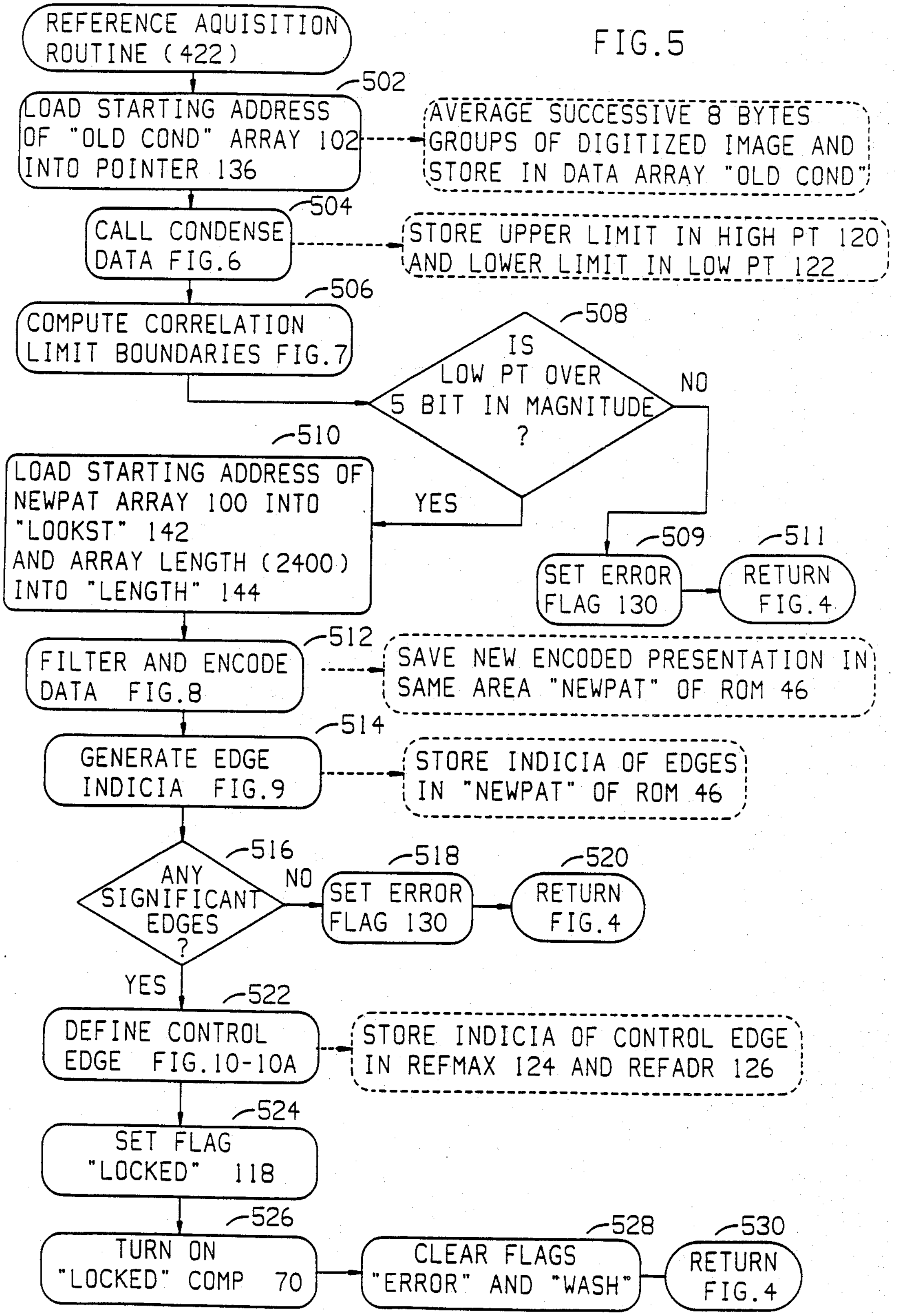

As previously noted, after an image signature has been installed in NEWPAT array 100, if it is determined that the system has not yet acquired a reference pattern, reference acquisition routine 422 is executed. Referring now to FIG. 5, reference acquisition routine 422 will be more fully described.

To facilitate cross-correlation analysis as will be explained in conjunction with FIGS. 12 through 17, reference acquisition routine 422 generates indicia of upper and lower limits about the point of maximum amplitude of the auto-correlation function of the signature represented in NEWPAT array 100. However, the cross-correlation process is relatively time consuming, and is has been found that the resolution that would be achieved by operating upon the 2,400 elements of NEWPAT array 100 is not necessary if used in conjunction with the second position error determination procedure. Accordingly, an array of condensed data (data of lesser resolution) is generated and stored in a predetermined block of memory locations, OLDCOND array 102. The starting address of OLDCOND array 102 is loaded (step 502) into an address pointer 136 to identify the portion of RAM 46 wherein the condensed data is to be stored. A condense data routine 504 is then called. In general, condense data routine (step 504) averages successive eight byte groups of data elements in NEWPAT array 100 and stores the average value in successive locations in RAM 46 in accordance with address pointer 136 (here, in OLDCOND array 102). Thus, an array OLDCOND 102 is generated comprising three hundred successive locations in RAM 46, each containing indicia of the average image density of eight successive incremental units of web 14. Condense data routine 504 is also utilized in connection with the error computation routine 424, as will be explained, and will hereinafter be more fully described in conjunction with FIG. 6.

After the condensed data array OLDCOND 102 is generated, correlation limit boundaries are computed for use in determining whether or not an error condition has arisen in connection with the cross-correlation analysis performed during the course of error computation routine 424. Specifically, a compute correlation limit boundaries routine (step 506) is called, briefly, the maximum of the auto-correlation function is determined on OLDCOND array 102 (each element of the array is squared and the squares summed). Upper and lower deviation limits are then computed and stored in HIGHPT register 120 and LOWPT register 122 respectively. The process of computing the deviation limits will hereafter be more fully described in conjunction with FIG. 7.

After the upper and lower limits (HIGHPT 120, LOWPT 122) have been determined, the data is tested to ensure that the image density is not so low as to indicate an error condition. Specifically, the contents of LOWPT 122 are tested (step 508) to ensure that the magnitude of the lower limit is at least five bits in magnitude (i.e., at least equal to 32). If not, error flag 130 is set, and the program returned to the main loop (FIG. 4) whereupon error flag 130 is tested (step 426) causing pause lamp 72 to be set (step 428) and auto-mode process motor movement inhibited (408).

As noted above, system 10 employs an alternative high resolution edge position error determination procedure. Accordingly, assuming that the LOWPT 122 value test is passed, the high resolution data in NEWPAT array 100 is processed to generate indicia of a control edge (edge having maximum magnitude density change) for use in determining positional deviation of subsequent signatures from the reference signature (as will be explained in conjunction with FIG. 11). Operation upon NEWPAT array 100 is specified by loading the starting address of NEWPAT array 100 into a register LOOKST 142 and the array length (2,400) into a register LENGTH 144 (step 510).

The raw high resolution data in NEWPAT array 100 is first filtered (smoothed) to remove the effects of noise, then delta-encoded to facilitate processing. More specifically, a filter and encode data routine (step 512) is called which operates upon the data in NEWPAT array 100, such that each element of NEWPAT array 100 reflects the density change from the corresponding sampling point in the machine cycle to the next successive sampling point (i.e., the difference in density from that point to the next). Filter and encode data routine 512 will hereinafter be more fully described in conjunction with FIG. 8.

The delta-encoded data in NEWPAT array 100 is then processed (step 514) to generate indicia of each significant edge (each edge having a density change amplitude above a predetermined threshold level), and to store the indicia in a NEWPAT array 100 location corresponding to the position of the edge relative to the machine cycle. Each delta-encoded entry in NEWPAT array 100 represents a change in density from a given sampling point to the next (as opposed to the magnitude of the density at the sampling point). Accordingly, an edge is defined as those samples between successive zero crossings in the delta-encoded data, i.e., from the point where the image density begins to change until the point where the density stops changing, or begins to change in the opposite direction. Recalling that each sampling point correspond to 0.002 inch intervals, significant changes in density encompass a plurality of sampling points. However, it is desirable to associate each edge with a single particular location. Accordingly, the center of moment of the edge is determined, and the edge indicia is stored in the address corresponding to the center of moment. Thus, the rough position of the edge (the sampling interval during which the edge occurs is identified by the particular location in NEWPAT array 100 in which the indicia of the edge is stored. As will hereinafter be more fully explained in conjunction with FIG. 9, the edge indicia comprises an indication of the sign (polarity) of the edge, indicia of the particular quarter of the sampling interval in which the center of moment of the edge is located (to obtain a resolution of one-quarter of a sampling interval), and the magnitude of the density change (sum of deltas).

If no significant edges are found (step 516) in the signature, error flag 130 is set (step 518), and a return to the main loop (FIG. 4) is effected, resulting in inhibition of automatic mode motor movement, as previously noted.

Assuming, however, that significant edges are found in the image, a particular edge (edge having maximum density change) is defined as a control edge, and the indicia and address thereof stored in the REFMAX register 124 and REFADR register 126, respectively (step 522). The process 522 of defining control edge will hereinafter be more fully explained in conjunction with FIGS. 10 and 10A.

After the control edge indicia have been stored in the REFMAX and REFADR registers 124 and 126, locked flag 118 is set (step 524), locked lamp 70 on control console 56 is turned on (step 526). Similarly, since proper indicia of the reference pattern was established, the error and wash flags 130 and 132 are cleared (step 528) and a return (step 530) to the main loop (FIG. 4) effected.

Upon return to the main loop (FIG. 4), assuming no speed change, the motor control process 430 is initiated. Presumably, no position error signals are generated during the reference acquisition routine 422 and the main loop is resumed at the monitoring web movement (step 406).

Figure 6:
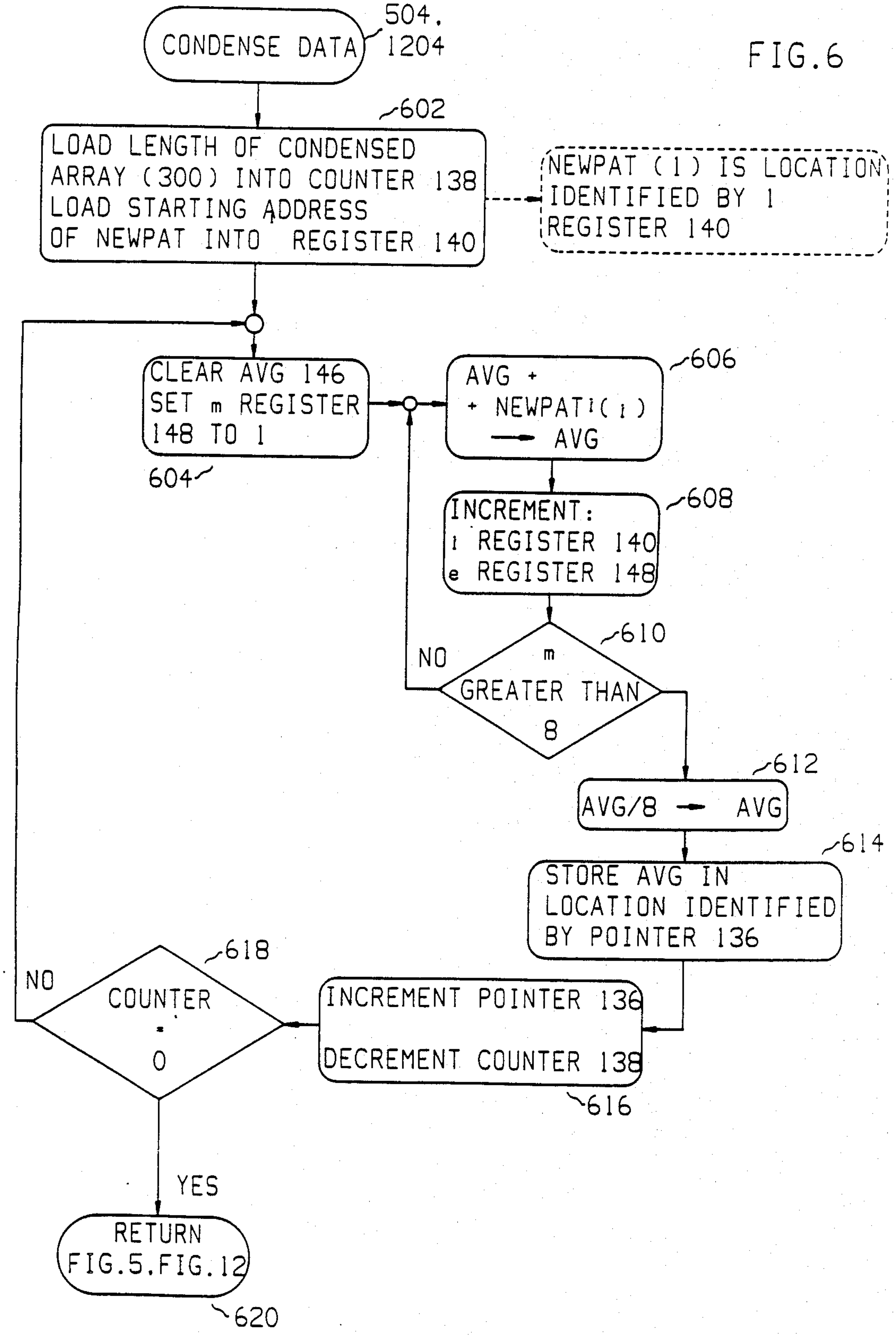

As previously noted, the reference acquisition routine 422 (and error computation routine 424, as will be explained), entails generating an array of condensed data (data of lesser resolution than the 2,400 samples of data collected in NEWPAT array 100). Referring now to FIG. 6, the condense data routine (step 504 and step 1204, as will be explained) will be more fully described. The calling routine (i.e., reference acquisition routine 422 or error computation routine 424) specifies the block of locations in RAM 46 in which the condensed data is to be stored (in the case of reference acquisition routine 422, OLDCOND array 102; in the case of error computation routine 424, NEWCOND array 184, as will be explained) by loading the starting address of the receiving array into address pointer 136 (see, e.g., step 502 of reference acquisition routine 422 and step 1202 of cross-correlation analysis 1101). The process is initialized (step 602) by loading the length (three hundred) of the condensed data array into a designated register in RAM 46, e.g., counter 138, and the starting address of NEWPAT array 100 into another designated register in RAM 46, e.g., I register 140.

A reiterative process is then executed to average each successive group of eight bytes of high resolution data in NEWPAT array 100, and store the average values in successive locations of RAM 46 in accordance with address pointer 136. Respective temporary registers are specified in RA 46, e.g., AVG register 146 and M register 148. AVG register 146 is initially cleared and M register 148 initially set to one (step 604) to begin the reiterative process.

The contents of eight successive NEWPAT elements are then sumed in AVG register 146. More specifically, the contents of AVG register 146 and the contents of the NEWPAT array location identified by I register 140 are summed and loaded back into AVG register 146 (step 606). I register 140 is then incremented to specify the next successive location in NEWPAT array 100 and M register 148 is likewise incremented (step 608). The contents of M register 148 are then tested against eight (step 610). If less that eight iterations have occurred, the process (beginning with step 606) is repeated with respect to the NEWPAT array 100 element presently identified by I register 140. At the end of eight iterations, AVG register 146 contains the sum of the contents of eight successive NEWPAT array 100 elements.

The averaging function is then completed by dividing the contents of AVG register 146 by eight and loading the result back into AVG register 146 (step 612). The contents of AVG register 146 are then stored in the RAM 46 location (e.g., specified OLDCOND array 102 element) identified by address pointer 136 (step 614).

Address pointer 136 is then incremented, to identify the next successive element in the specified condensed data array, and counter 138 is decremented (step 616). The contents of counter 138 are then tested against zero to determine whether the entire condensed data array has been generated. If the count has not reached zero, the averaging process is repeated beginning with initialization 602 for the next group of eight data bytes in NEWPAT array 100. In this regard, while M register 148 is reset to one and AVG register 146 cleared in initialization step 602, I register 140 (specifying the locations in NEWPAT array 100 to be operated upon) maintains a continual count so that each successive condensed array element corresponds to a successive group of NEWPAT array 100 elements.

Figure 12:
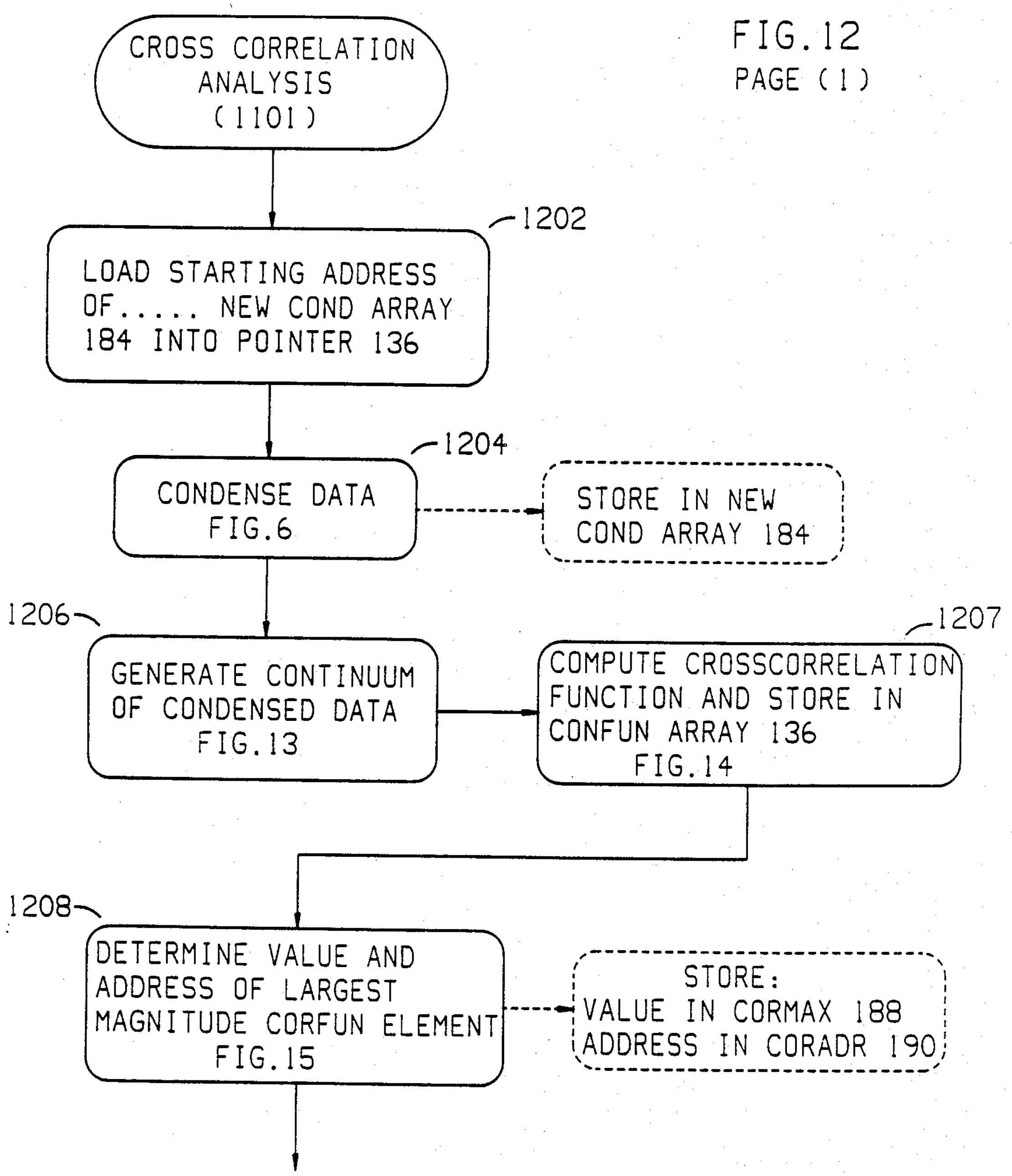
Figure 12:
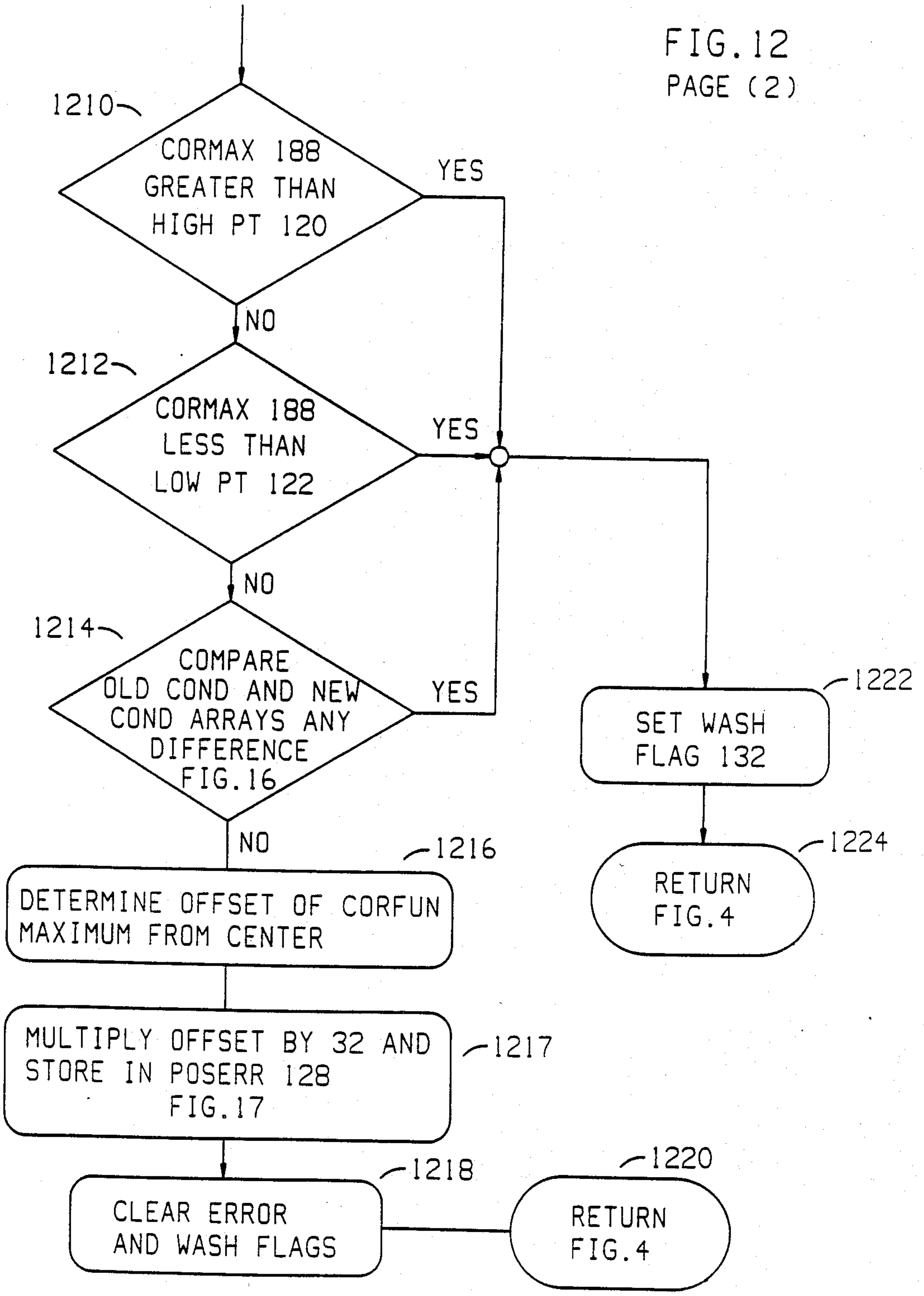

After all three hundred condensed data array elements have been generated a return (step 620) is effected to the calling routine (FIGS. 5 or 12). Thus, a condensed data array is generated beginning at the address loaded into pointer 136 by the calling routine, comprising three hundred successive elements representing the average image density of successive groups of eight incremental units of web 14.

Figure 7:
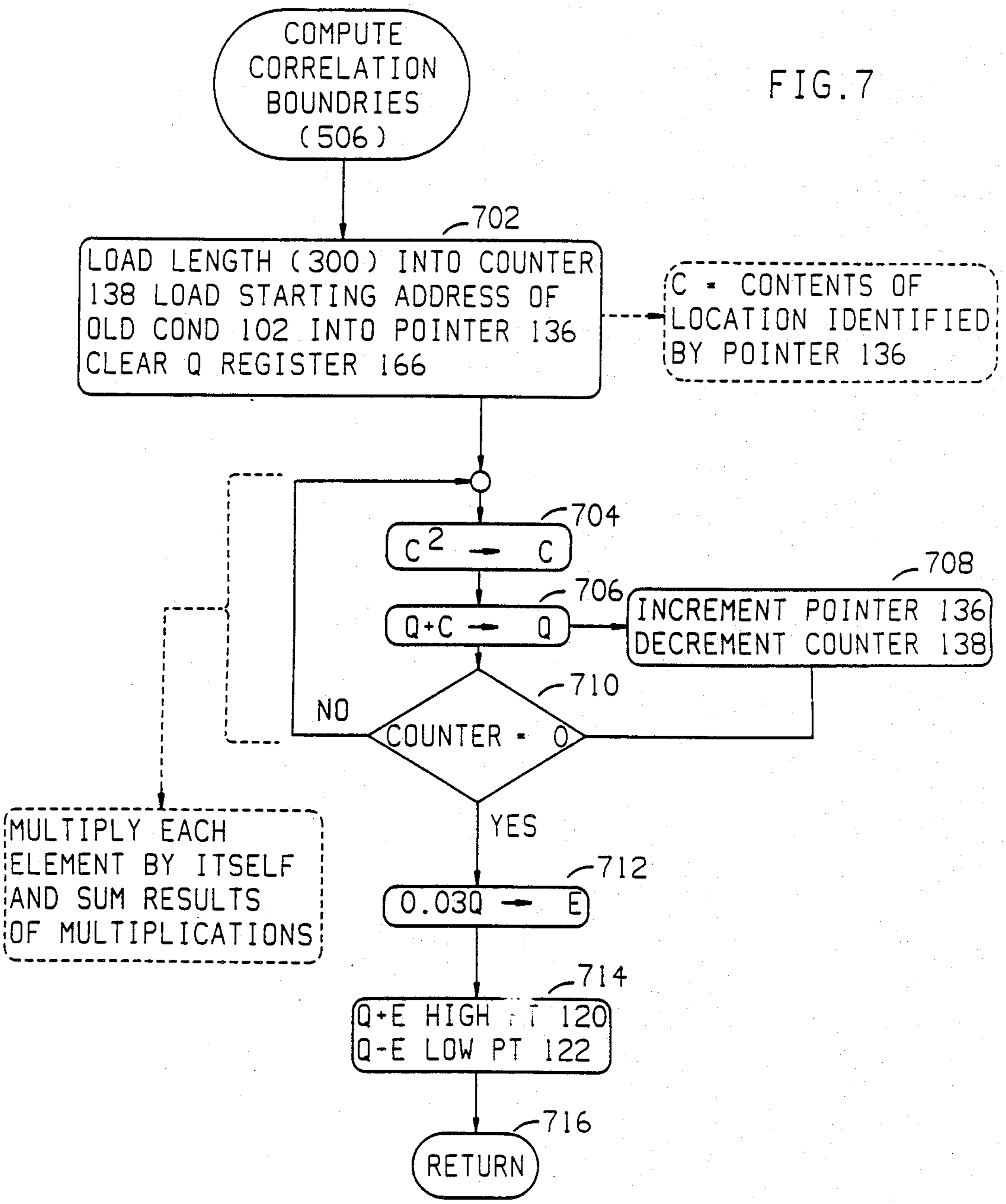

As previously noted, reference acquisition routine 422 entails generation of correlation limit boundaries for use in the cross-correlation analysis. Referring now to FIG. 7, a suitable procedure for computing such correlation boundaries (step 506) will be described. The process is initialized (step 702) by loading the starting address of the condensed data array representing the reference pattern, i.e., OLDCOND 102, into address pointer 136, loading the length (three hundred) of OLDCOND array 102 into counter 138, and clearing a specified register in RAM 46, e.g., Q register 166.

The maximum element of the auto-correlation function is then determined with respect to the condensed reference pattern data contained in OLDCOND array 102. Specifically, each element of the OLDCOND array 102 is squared and the squares sumed to determine the auto correlation function This process is implemented through an iterative process as follows. The contents of the location identified by address pointer 136 (initially the first element in the OLDCOND array 102) is loaded into a designated location in RAM 46, e.g., C register 150 (step 703). The contents of C register 150 are then squared, and the square loaded back into C register 150 (step 704). The contents of C register 150 are then accumulated in Q register 166 (step 706), i.e, the contents of the C register 150 are arced to the contents of Q register 166 and the sum maintained in Q register 166.

Address pointer 136 is then incremented to designate the next successive OLDCOND array 102 element and counter 138 decremented (step 708). The contents of counter 138 are tested against zero (step 710) and, if not equal to zero, the process repeated with respect to the location presently designated by address pointer 136. After three hundred iterations (counter equal zero), Q register 166 contains the sum of the squares of each of the elements of OLDCOND array 102.

A permissible percentage deviation is then calculated and temporarily stored in a designated register in RAM 46, e.g., E register 152. Specifically, three percent (3%) of the contents of Q register 166, adopted as a permissible deviation, is calculated, and stored in E register 152 (step 712).

A permissible upper limit (Q+E) and lower limit (Q−E) are then saved in HIGHPT register 120 and LOWPT register 122, respectively, as (together with the condensed data array OLDCOND 102) indicia of the reference pattern, and a return (step 716) to the calling routine (FIG. 5) is effected.

Figure 8:
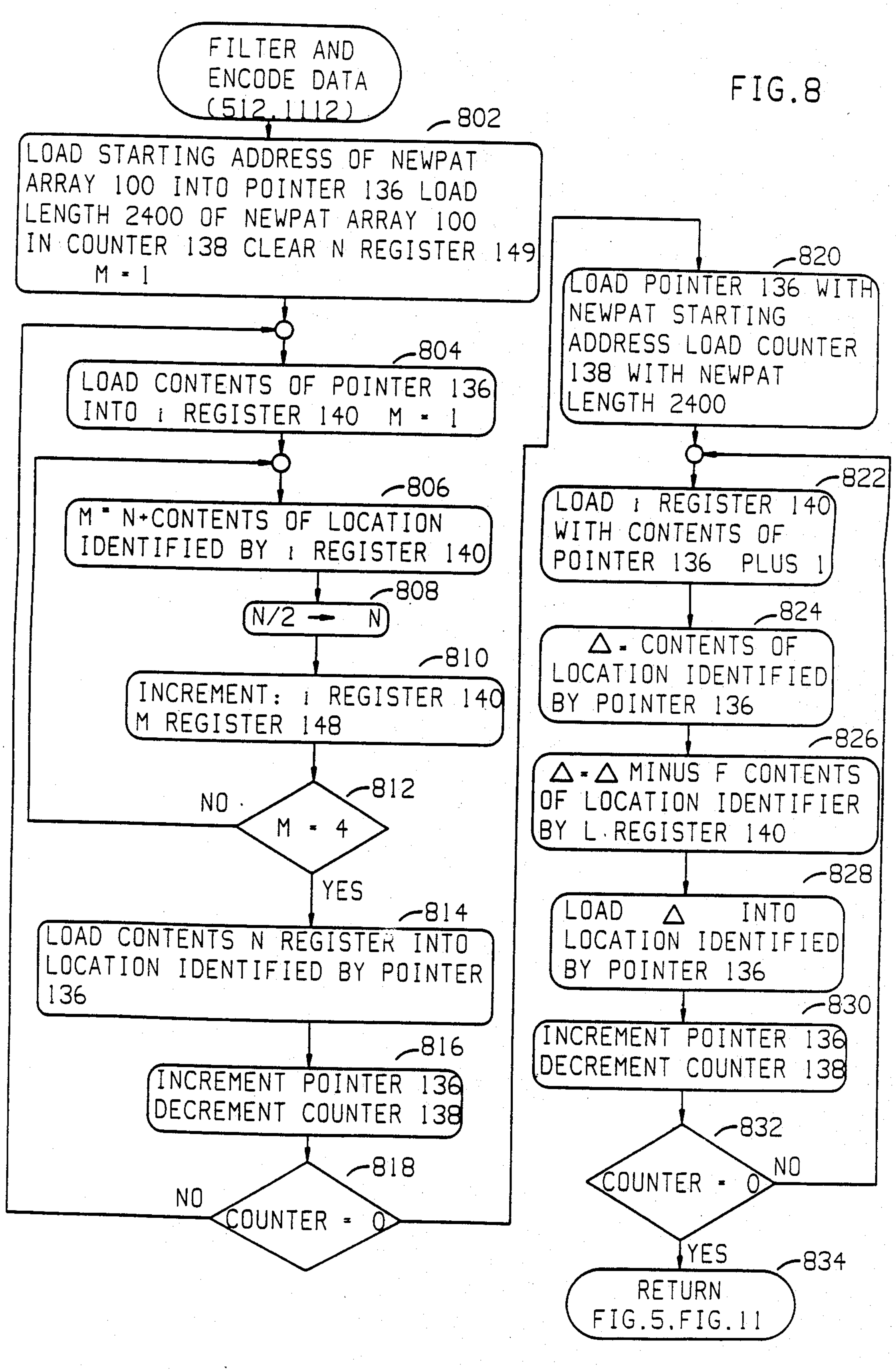

As previously noted, reference acquisition routine 422 (and, as will be explained, error computation routine 424), entails the process of filtering (smoothing) the high resolution data in NEWPAT array 100 to remove the effects of noise, and delta-encoding the high resolution data to facilitate processing. Referring now to FIG. 8, a suitable procedure for filtering and encoding the high resolution data will be more fully described.

The process is initialized (step 802) by loading the starting address of the NEWPAT array 100 into address pointer 136, and the length (2,400) of the NEWPAT array 100 into counter 138. Respective registers, e.g., M register 148 and N register 149 are specified, and N register 149 cleared.

The raw data in NEWPAT array 100 is then smoothed to alleviate the effects of noise, suitably in accordance with the following formula:

$$Ni=(((n_i+n_{i+1})/2+n_{i+2})/2+n_{i+3})/2 \quad (1)$$

Where $N_i$ is the smoothed data value, $n_i$ is the original date value, $n_{i+1}$ is the original data value in the next successive location, and so forth.

The smoothing function is implemented through a iterative process as follows. The interactive process is initiated (step 804) by loading the contents of address pointer 136 (initially the address of the first element in NEWPAT array 100) into a specified register in RAM 46, e.g., I register 140, setting another designated register in RAM 46, e.g., M register 148, to one, and clearing a third designated register, e.g., N register 149. The contents of the location identified by I register 140 is then added to the contents of N register 149 (initially zero) and the sum maintained in N register 149 (step 806), and the contents of N register 149 is then divided by two (step 808).

I register 140 is then incremented to denote the next successive NEWPAT array 100 element, and M register 148 likewise incremented (step 810). The M index (contents of M register 148) is then tested against four (step 812). If M register 148 does not equal four, the process is repeated with respect to the location of the NEWPAT array 100 now identified by I register 140 (the next successive location). At the end of four iterations, N register 149 contains the smoothed value of the data element in accordance with the foregoing equation(1). Accordingly, the contents of N register 149 are loaded (step 814) into the location identified by address pointer 136 (at this point the first location in NEWPAT array 100).

Address pointer 136 is then incremented to specify the next successive element in NEWPAT array 100, and counter 138 decremented (step 816). The contents of counter 138 are then tested against zero to determine if each element of NEWPAT array 100 has been processed in accordance with the smoothing function. If the contents of counter 138 are not equal to zero, the process is repeated with respect to the location now identified by address pointer 136. Thus, at the end of 2,400 iterations, each of the 2,400 high resolution data elements contained in NEWPAT array 100 have been altered (smoothed) to alleviate the, effect of noise.

After the smoothing function has been completed, the data is delta-encoded to facilitate processing. Specifically, address pointer 136 and counter 138 are reloaded with the starting address of NEWPAT array 100 and length of NEWPAT array 100, respectively (step 820).

A reiterative procedure is then utilized to replace the image density indicia contained in the respective locations of NEWPAT array 100 with indicia of the difference in image density between that location and the next successive location (sampling point). A second index is generated by adding one to the contents of address pointer 136 (to designate the address of the next successive location after that identified by the contents of address pointer 136) and loading the sum into a specified register in RAM 46, e.g., I register 140 (step 822).

The contents of the location identified by address pointer 136 (at this point the first location in NEWPAT array 100) are then loaded into a designated register in RAM 46, e.g., delta register 154 (step 824).

The contents of the (next successive) location identified by I register 140 are then subtracted from the contents of delta register 154, and the results maintained in delta register 154 (step 826). The contents of delta register 154 thus represent the difference between the image density value contained in the NEWPAT array 100 element designated by address pointer 136 and the next successive element designated by I register 140, that is, the delta code in respect of the element identified by address pointer 136. Accordingly, the contents of delta register 154 are loaded (step 828) into the location identified by address pointer 136, replacing the initial density data.

Address pointer 136 is then incremented to designate the next successive NEWPAT array 100 element and counter 138 is decremented (step 830) and the contents of counter 138 are then tested against zero to determine if the entire array has been delta-encoded. If the count is not equal to zero, the process is repeated with respect to the next successive NEWPAT array 100 element now designated by address pointer 136. After 2,400 iterations, the entire array has been processed and counter 138 assumes a zero count, whereupon a return (step 834) to the calling routine (FIGS. 5 or 11) is effected.

Figure 9:
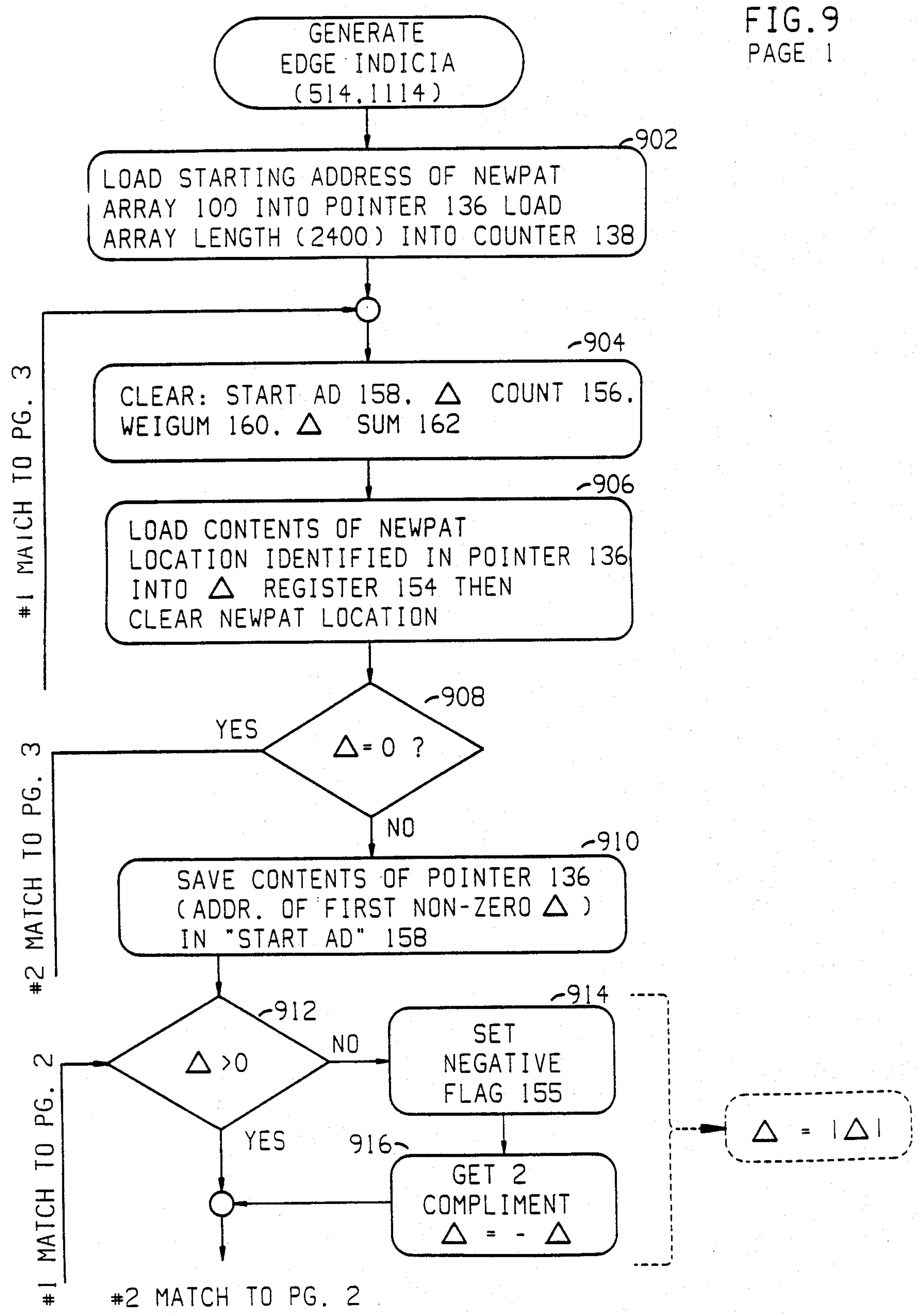
Figure 9:
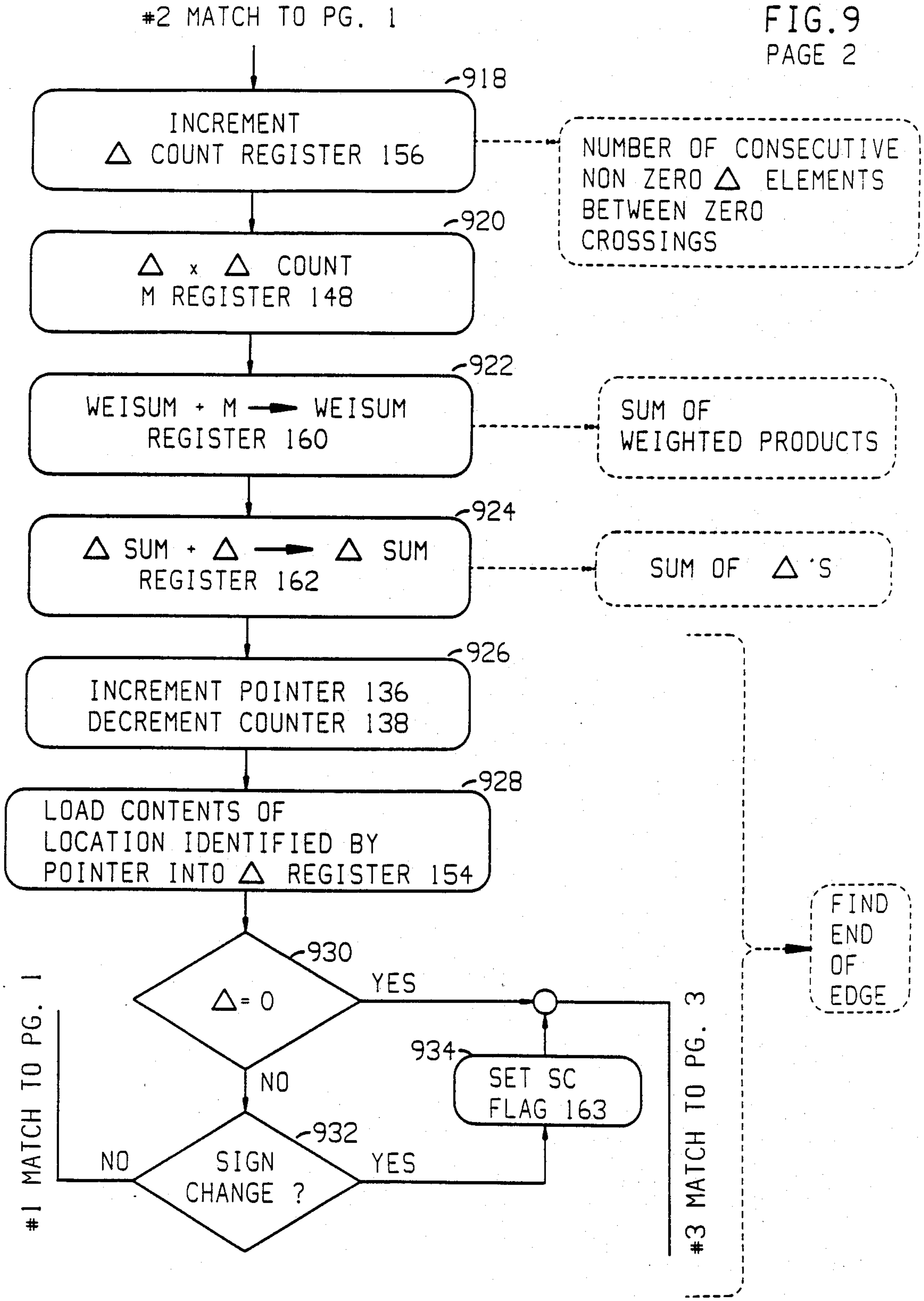
Figure 9:
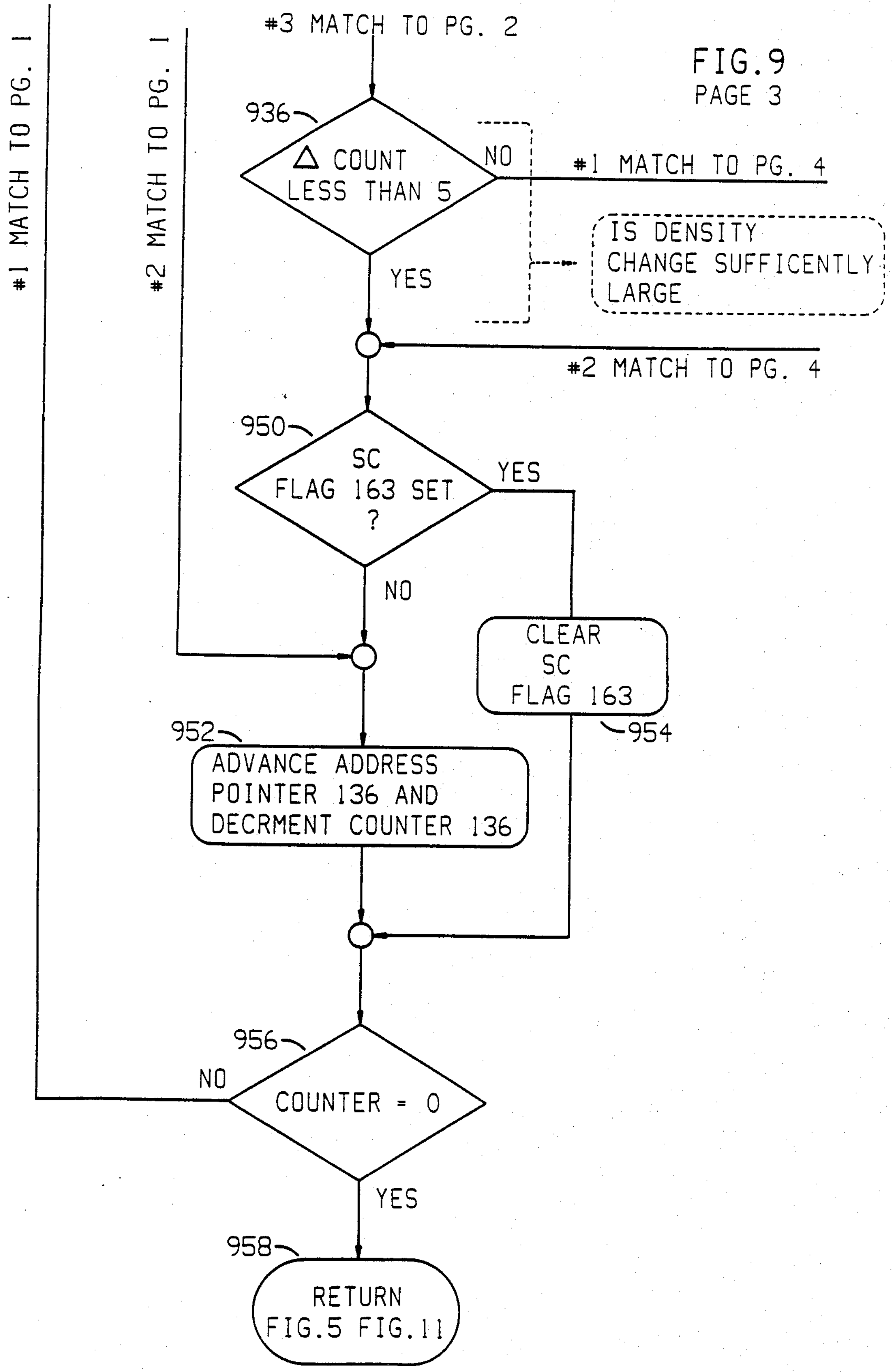
Figure 9:
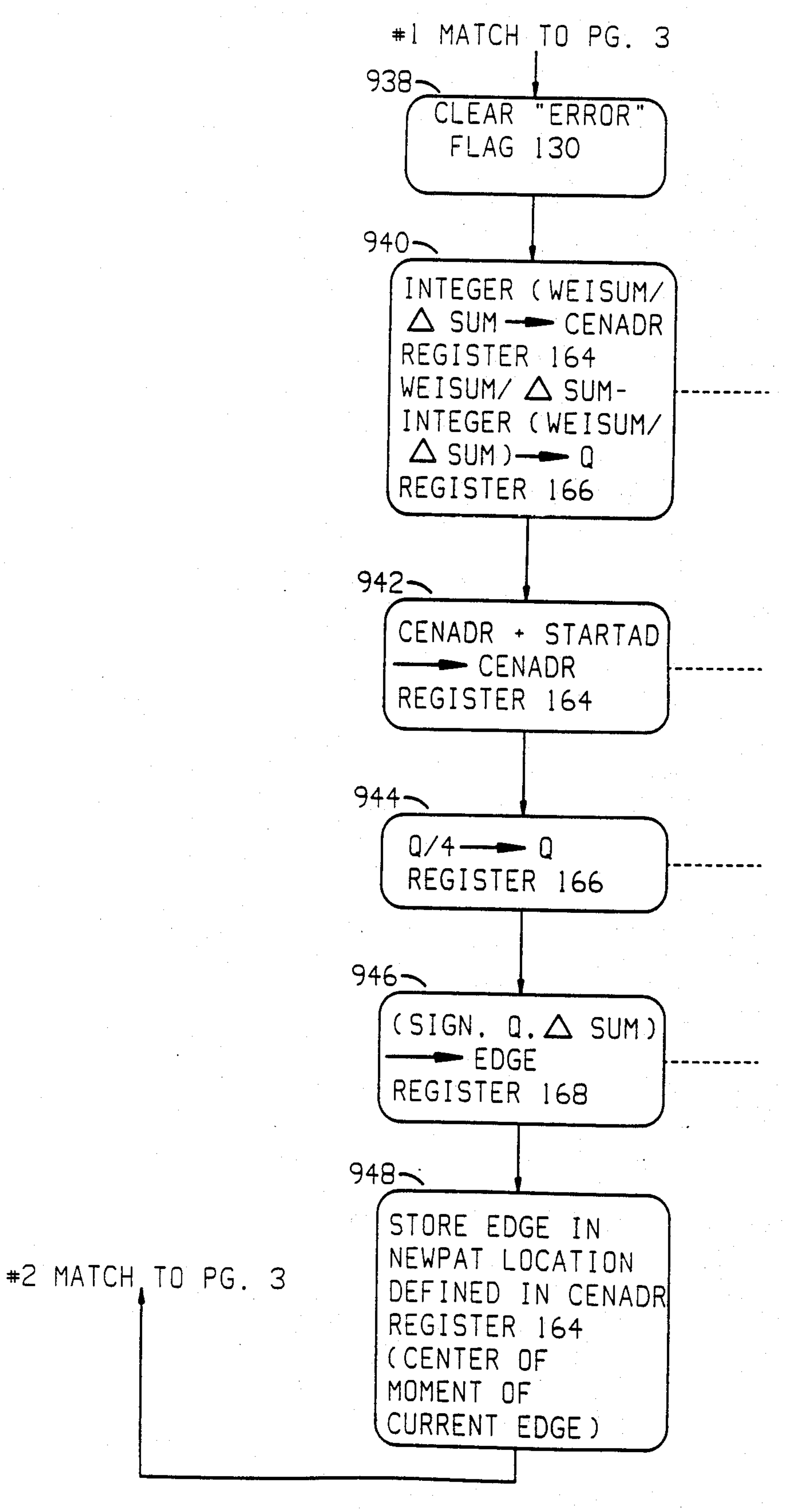

As previously noted, after the high resolution image density data initially collected in NEWPAT array 100 is filtered and delta-encoded, the delta-encoded data is processed (step 514) to generate indicia of each "edge" in the signature having a density change amplitude above a predetermined threshold level, and to store the indicia in a location in NEWPAT array 100 corresponding to the position of the edge relative to the cutting mechanism 22 cycle. Density changes in the image, i.e., a change from white to black or vice versa, are relatively gradual in the sense that the change occurs over a plurality of sampling points. Accordingly, an edge is defined as the point in the image where the image density begins to change until the point where the density stops changing or begins to change in the opposite direction, i.e., samples between successive zero crossings in the delta-encoded data. However, it is desirable to associate the edge with a particular point in the image for correlation purposes. Accordingly, the center of moment of the edge is determined, and the edge indicia stored at the address corresponding thereto, so that the location in which the edge indicia is stored operates as indicia of the point where the edge occurs relative to the machine cycle. More specifically, an iterative process is utilized to generate indicia of the value and determine the center of moment of each edge reflecting a density change above a predetermined threshold level. A suitable process is illustrated in FIG. 9.

The process is initiated (step 902) by loading the starting address of NEWPAT array 100 into address pointer 136 and the array length (2,400) into counter 138. Respective designated registers in RAM 46, e.g., STARTAD 158, WEISUM 160 and DELTASUM 162 are then cleared (step 904) in preparation for the iterative edge computation.

The contents of the location identified by address pointer 136 (at this point, the first location in NEWPAT array 100) is loaded into a designated register in RAM 46, e.g., delta register 154, and the location in NEWPAT array 100 identified by address pointer 136 is cleared (step 906).

The contents of delta register 154 are then tested to determine if they are non-zero, i.e., if there was a change in density from the corresponding sampling point to the next (step 908). Assuming that the delta element is non-zero, i.e., the image density changed from the corresponding sampling point to the next sampling point, the beginning of an edge is indicated, and the contents of pointer 136 (the address of the location from which the delta element was taken) is saved (step 910) in STARTAD register 158.

The polarity and absolute value of the delta element is then determined. The sign of the delta element is first tested (step 912). If delta is negative, a negative flag 155 is set (step 914), and the contents of delta register 154 converted into a two's complement representation (step 916).

A count (delta count) is maintained in DELTACOUNT register 156 indicative of the number of non-zero delta elements between successive zero crossings, i.e., the number of delta elements in the edge. The DELTACOUNT register 156 is incremented after determination of the absolute value of the delta element (step 918).

The sum of weighted product of the delta element in respect of its position in the edge is then calculated. The contents of delta register 154 are multiplied by the delta count in DELTACOUNT register 156 and loaded into a designated temporary register, e.g., M register 148 (step 920).

The cumulative sum of weighted products for each of the delta elements in the edge is then accumulated in WEISUM register 160. That is, the contents of the WEISUM register 160 (initially zero) are sumed with the contents of M register 148 and the resultant sum stored in WEISUM register 160 (step 922).

Likewise, the cumulative sum of delta values in the edge is determined and stored in DELTASUM register 162. Specifically, the contents of delta register 154 is sumed with the contents of the DELTASUM register 162 (initially zero), and the sum retained in DELTASUM register 162 (step 924).

A determination is then made as to whether or not the end of the edge has been reached, i.e., a zero crossing has occurred. Address pointer 136 is incremented to designate the next successive location in NEWPAT array 100, and counter 138 is decremented (step 926). The contents of the next successive NEWPAT array 100 location (as identified by the present contents of address pointer 136) are then loaded into delta register 154 (step 928). The contents of delta register 154 are then tested against zero (step 930) and as to sign change from the previous element, i.e., the sign of the contents of delta register 154 is tested against the contents of negative flag 155 (step 932). If the contents of delta register 154 are equal to zero, or are non-zero but differ in polarity from the previous delta element, a zero crossing has been reached, signifying the end of the edge. To facilitate proper iteration, and to ensure complete processing of each edge, when a sign change is detected in step 932, a sign change (SC) flag 163 in RAM 46 is set (step 934). If the delta element is non-zero, and no sign change has occurred, the end of the edge has not yet been reached, and accordingly, the contents of delta register 154 are processed in the same manner described above beginning with step 912.

At the point when a zero value delta or sign change occurs, signifying the end of the edge, WEISUM register 160 contains the sum of the weighted product of the delta elements in the edge, DELTASUM register 162 contains the sum of the delta values, DELTACOUNT register 156 contains a count indicative of the number of delta elements in the edge, and STARTAD register 158 contains the address of the first element of the edge.

When the end of the edge is detected, the count of consecutive delta elements in DELTACOUNT register 156 is tested against five to determine whether the image density change represented by the edge is sufficiently large.

Assuming that the contents of DELTACOUNT register 156 is not less than five, the edge is deemed significant, error flag 130 is cleared, and indicia of the edge is generated. The relative address of the center of moment of the edge from the beginning of the edge is first determined (step 940). Specifically, the sum of weighted products contained in WEISUM register 960 is divided by the sum of deltas contained in DELTASUM register 162. The whole number result of the division is then stored in a designated register in RAM 46, e.g., CENADR register 164. The remainder of the division is stored in another designated register in RAM 46, e.g., Q (quadrant) register 166 (step 941).

The absolute address of the center of moment of the edge is then determined (step 942). The relative address contained in CENADR register 164 is added to the address of the first delta element in the edge (contents of STARTAD register 158), and the result stored in CENADR register 164.

An indication of the high resolution disposition of the center of moment within the incremental sampling period is then generated (step 944). Specifically, the remainder from the sum of weighted products/sum of deltas division is divided by four to determine which quadrant of the sampling period the center of moment resides in. The result of the division is then loaded into Q register 166.

Indicia of the edge is then generated (step 946). Specifically, the sign (contents of negative flag 155), the contents of Q register 166, and the sum of deltas contained in DELTASUM register 162 are loaded into sequential fields of a designated register in RAM 46, e.g., edge register 168.

The indicia of the edge stored (step 948) in edge register 168 is then stored in the NEWPAT array 100 location corresponding to the center of moment of the edge as defined in CENADR register 164.

After the edge indicia has been stored in the appropriate location of NEWPAT array 100, the sign change flag 163 is tested (step 950), if the sign change flag 163 is not set, it is indicative that the delta element indicated by the present contents of address pointer 136 is zero value. Thus, address pointer 136 is again incremented to designate the next successive location in NEWPAT array 100 and counter 138 decremented (step 952). Likewise, if the delta element is initially found to be of zero value in response to step 908, address pointer 136 is incremented to designate the next successive location in NEWPAT array 100 and counter 138 decremented (step 952).

If, however, the sign change flag 163 is set, it is indicative that a non-zero element is resident in delta register 154, comprising the first element of a new edge. Accordingly, sign change flag 163 is cleared (step 954) and the incrementing address pointer 136 step omitted so that the NEWPAT array 100 location identified by address pointer 136 is fully processed by the program.

After the sign change flag 163 is cleared (or, in the case where sign change flag 163 was not set, after address pointer 136 is incremented and counter 138 decremented), the contents of counter 138 are tested against zero (step 956). If not equal to zero, the process is repeated on the NEWPAT array 100 location identified by address pointer 136 beginning with step 904. After 2,400 iterations, the entire NEWPAT array 100 has been cleared, except for indicia of significant edges stored at locations corresponding to the center of moment of the edge, and a return (step 958) to the calling routine (FIGS. 5 or 11) is effected.

Figure 10:
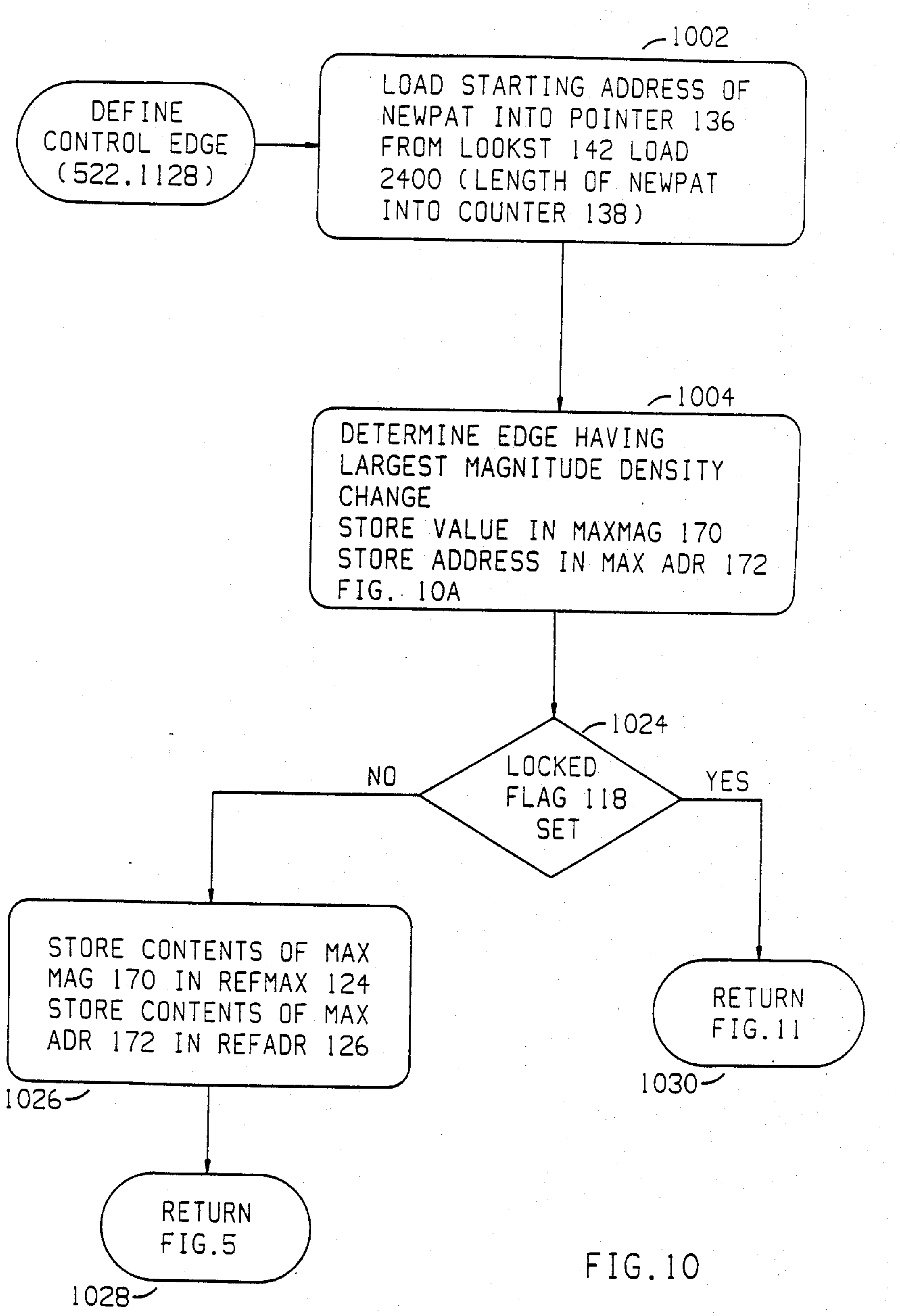
Figure 10A:
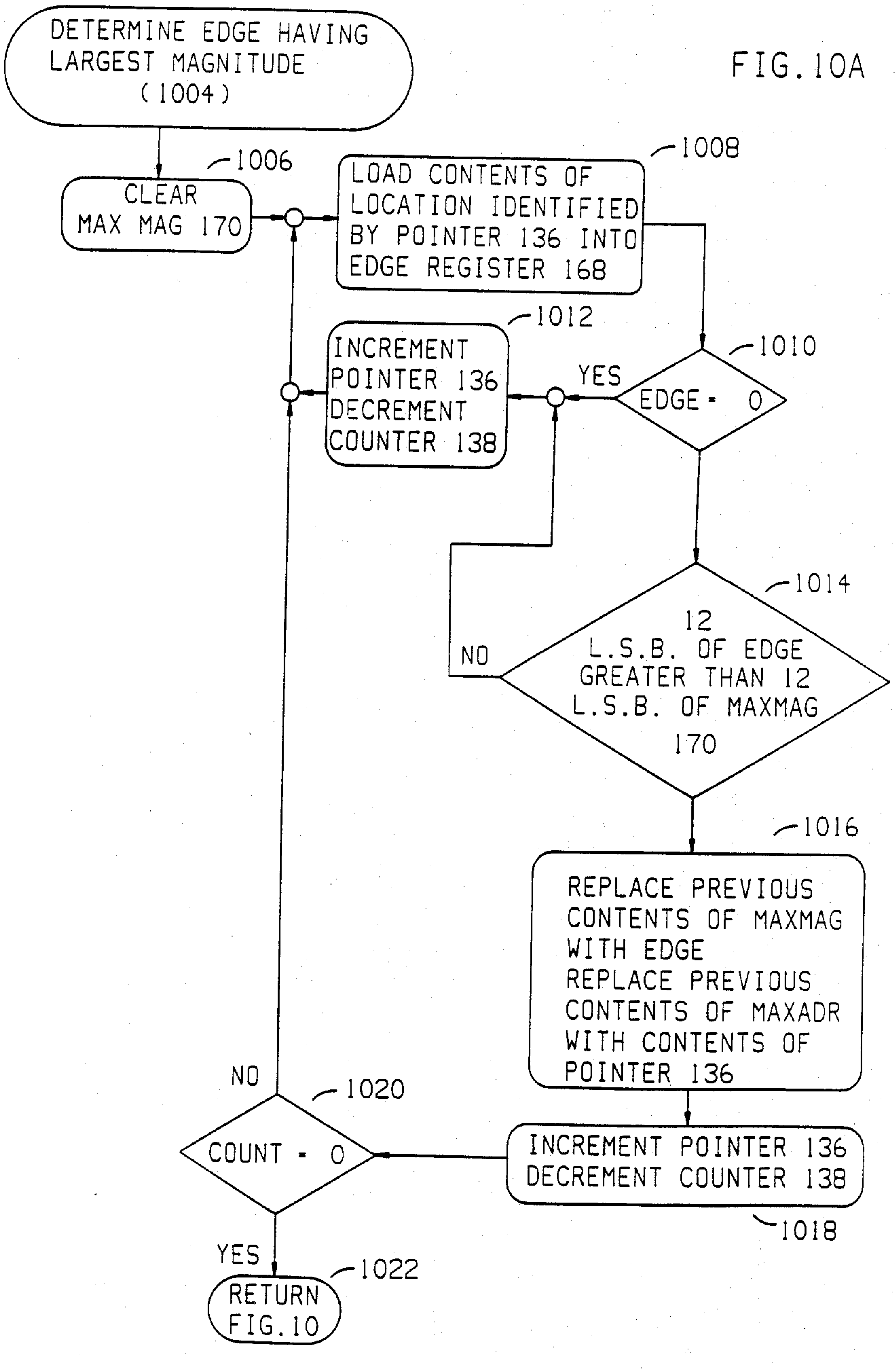

As previously noted, after the edge indicia has been generated and installed in NEWPAT array 100, the edge data is processed to define a particular edge as a control edge for position correlation purposes (step 522 and, as will be explained, 1128). Referring now to FIGS. 10 and 10A, the process of defining a control edge will be more fully described. The process is initiated (step 1002) by loading the starting address and length of NEWPAT array 100 into address pointer 136 and counter 138, respectively. The edge data in NEWPAT array 100 is then processed to determine the edge representing the largest magnitude density change. More specifically, with reference to FIG. 10A, a designated register in RAM 46, e.g., MAXMAG register 170, is initially cleared (step 1006). The contents of the location identified by address pointer 136 (initially the first location in NEWPAT array 100) are loaded (step 1008) into edge register 168, and the contents of edge register 168 tested against zero (step 1010). If the contents of edge register 168 are equal to zero, then address pointer 136 is incremented to designate the next successive location in the NEWPAT array 100, counter 138 decremented (step 1012), and the process repeated with respect to the newly designated NEWPAT array 100 location. When a non-zero element is found, the magnitudes included in the edge indicia (12 least significant bits) are then compared (step 1014) to determine the largest magnitude. If the magnitude represented in edge register 168 is not greater than that in MAXMAG register 170, address pointer 136 is incremented and counter 138 decremented, and the process repeated for the next successive location in NEWPAT array 100.

If, however, the magnitude contained in the edge register 168 is larger than that represented in MAXMAG register 170, the contents of MAXMAG register 170 are replaced with the contents of edge register 168, and the contents of address pointer 136 loaded into MAXADR register 172 (step 1016).

Address pointer 136 is then incremented to designate the next successive location in NEWPAT array 100, counter 138 decremented (step 1018), and the contents of counter 138 are tested against zero to determine whether the entire array has been processed. If the contents of counter 138 are not equal to zero, the foregoing comparison process (beginning with step 1008) is repeated with respect to the newly designated location of NEWPAT array 100. After 2,400 iterations, the entire NEWPAT array 100 has been processed, at which point the edge indicia representing the edge having the largest magnitude density change, and the address of that edge in NEWPAT array 100 are contained in MAXMAG register 170 and MAXADR register 172, respectively. The count reaches zero and a return (step 1022) is effected to FIG. 10.

Referring again to FIG. 10, after the largest magnitude density change edge indicia and address have been installed in MAXMAG register 170 and MAXADR register 172, a test is made to determine where the indicia and address are ultimately to be stored, that is, whether the control edge is to be used as a reference indicia or is to be compared against a referenced indicia. Accordingly, locked flag 118 is tested (step 1024) to determine whether or not a reference pattern has been acquired If locked flag 118 is not set, the edge indicia contained in MAXMAG register 170 is loaded into REFMAX register 124, and the address of the edge is loaded from MAXADR register 172 into REFADR register 126 (step 1026). A return to the calling routine (FIG. 5) is then effected (step 1028).

If, however, a reference pattern has already been acquired, and locked flag 118 is therefore set, an immediate return (step 1030) to the calling routine (FIG. 11) is effected, where the edge indicia and address contained in MAXMAG register 170 and MAXADR register 172 are utilized in the correlation process.

Figure 11:
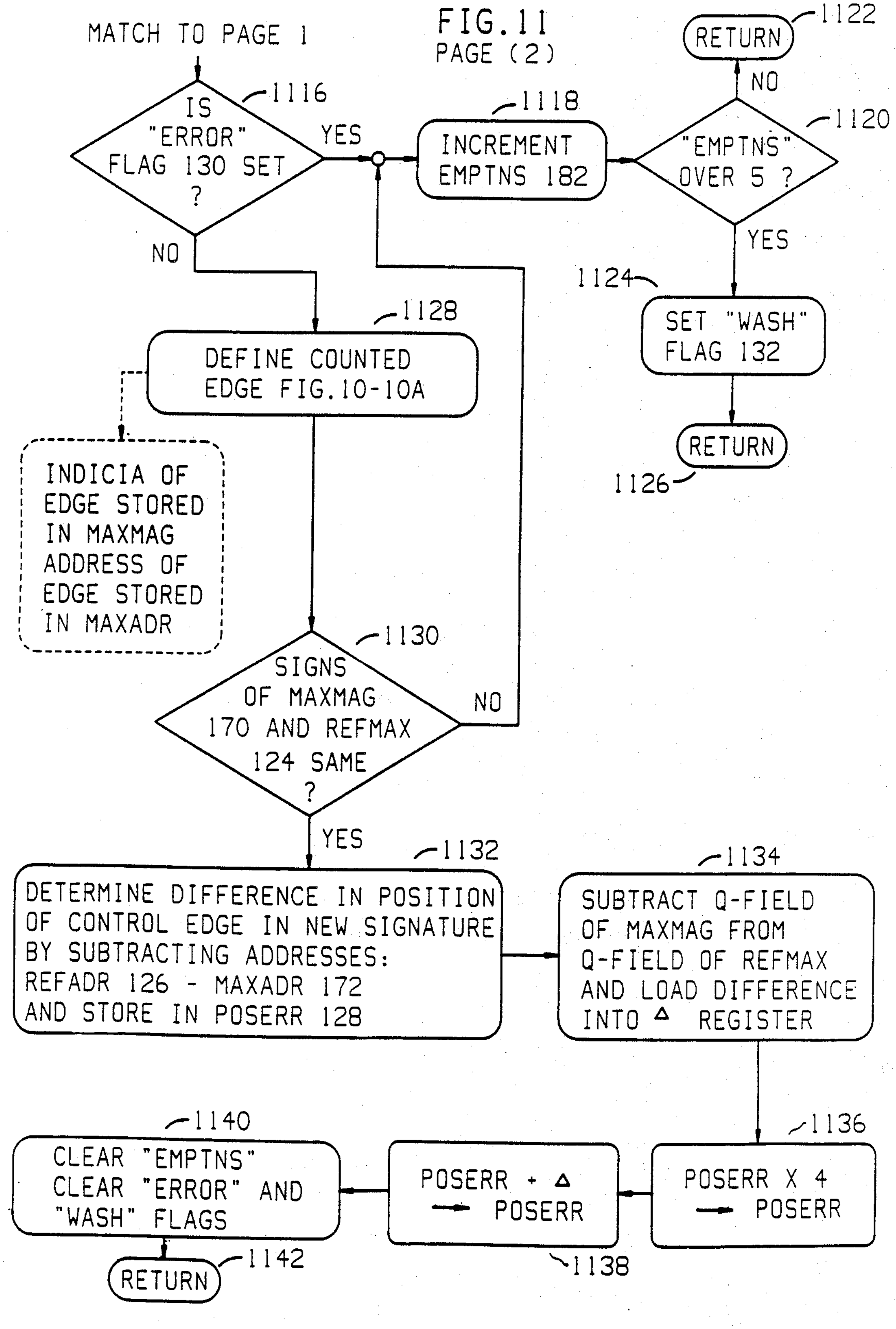

As previously noted, after a signature of data has been placed in NEWPAT array 100, if it is determined that a reference pattern has already been established (locked flag 118 is set, step 420), error computation routine 424 is performed, to determine any deviation in linear position of the new signature from the reference signature. In general, positional deviation is determined by comparing the position (address) of the maximum density change edge in the new signature to that of the reference signature. However, on a periodic basis (e.g., every thirtieth signature processed), or in the event that a preceding signature fails to provide a significant edge, a complete cross-correlation analysis is performed with respect to the new and reference patterns, whereby the maximum of the cross-correlation function is compared to the high and low threshold values in the HIGHPT and LOWPT registers 120 and 122. Positional deviation is determined from the offset of the correlation function maximum from the center of the machine cycle. In addition, the condensed data array representing the new signature is compared on an element by element basis to the condensed data representation of the reference signature stored in OLDCOND array 102, to ensure that the reference signature and new signature are substantially the same image. Referring now to FIG. 11, error computation routine 424 will be more fully described.

An initial determination is made as to whether or not a complete cross-correlation analysis (step 1101) is warranted, by testing error flag 130 (step 1102). An error condition would occur if after a reference pattern has been established, processing of a signature determined (FIG. 9) that the signature failed to contain any significant edges. Likewise, as a precautionary measure, a complete cross-correlation analysis 1101 is performed on a periodic basis. If error flag 130 is not set, the signatures processed counter, RAUTCO counter 180, is incremented (step 1104), and the contents of RAUTCO Counter 180 are then tested (step 1106). If the count is over thirty, e.g., every thirtieth signature processed, the cross-correlation analysis procedure 1101 is executed. A suitable cross-correlation analysis procedure 1101 will hereinafter be more fully described in conjunction with FIGS. 12 through 17.

Assuming that the signatures processed count in RAUTCO counter 180 is not over thirty, the new signature data in NEWPAT array 100 is analyzed to generate indicia of a control edge, for comparison against the control edge in the reference pattern.

As a practical matter, it is not necessary to process the entire signature represented in NEWPAT array 100. Since the new data presumptively represents the same image (albeit possibly offset from) as that represented by the reference signature, an offset of more than a predetermined distance (e.g., plus or minus twenty units, or 0.04 inch) tends to indicate an error condition. Accordingly, only those forty samples corresponding to samples within the predetermined range (e.g., plus or minus twenty samples) of the address of the reference pattern control edge are processed. In this regard, the number (forty) of samples in the portion of NEWPAT array 100 to be processed is loaded (step 1108) into LENGTH register 144. Likewise, the starting address of the portion of NEWPAT array 100 to be processed is determined and loaded (step 1110) into LOOKST register 142. More specifically, a number (twenty) equal to one half of the length of the portion of the array to be processed is subtracted from the address of the reference pattern control edge contained in REFADR register 126, and the result loaded in LOOKST register 142.

The data within the designated portion of NEWPAT array 100 is then filtered and encoded (step 1112) in a manner essentially identical to that described in conjunction with FIG. 8.

Indicia of the significant edges occurring within the designated portion of NEWPAT array 100 are then generated (step 1114) and stored in the location corresponding to the center of moment of the edge, in a manner essentially identical to that described in conjunction with FIG. 9.

Figure 4:
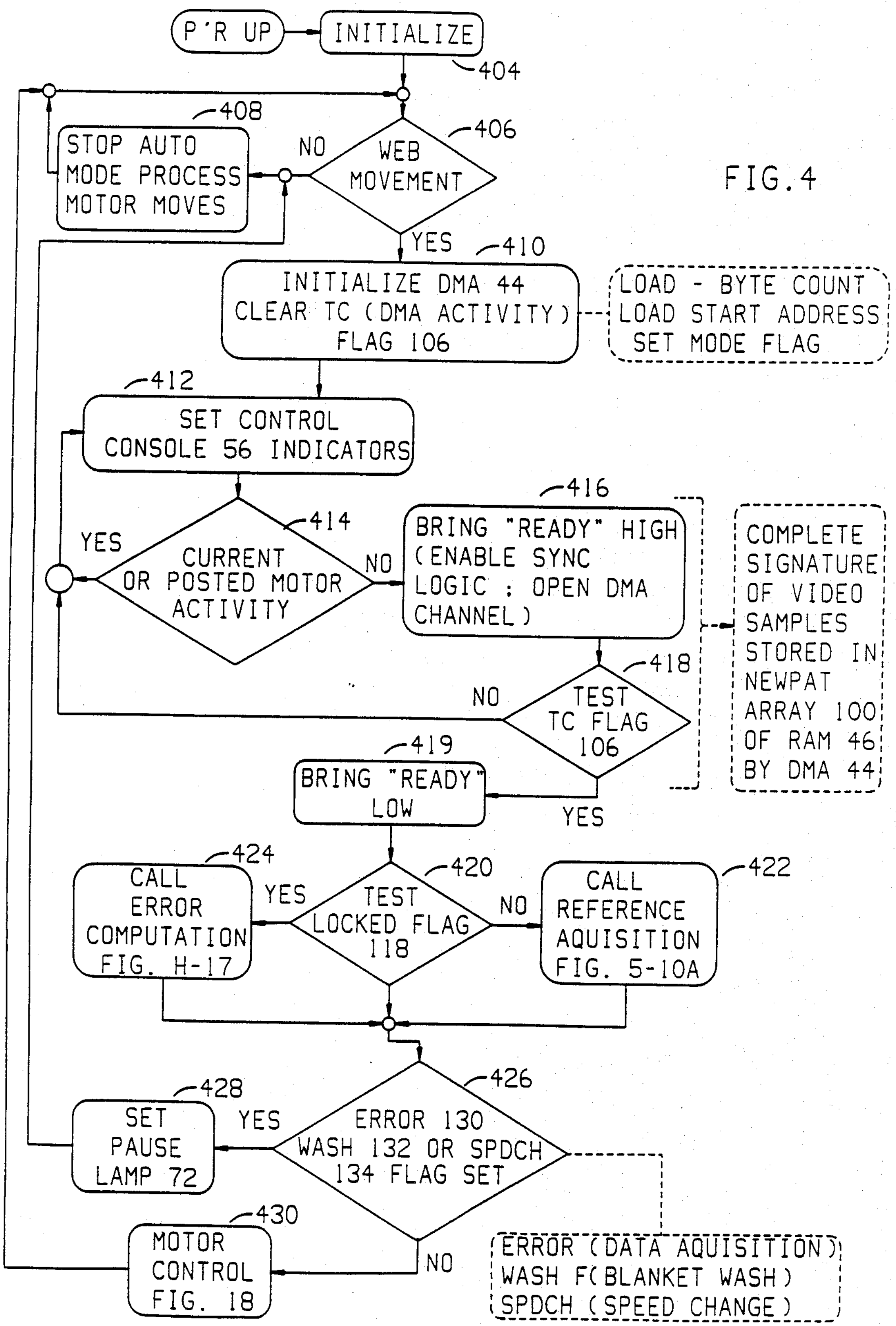
FIGS. 4–18 comprise a flowchart of a processing algorithm in accordance with the present invention.

Error flag 130 is then checked (step 1116) to determine whether or not any significant edges were found in the signature. If the error flag 130 is set, indicative of a lack of significant edges, a counter EMPTNS 182 (maintaining a count indicative of the number of signatures lacking any significant edge or having a control edge not conforming in sign to the reference pattern control edge) is incremented (step 1118). The contents of the EMPTNS counter 182 are then tested (step 1120) and, if the error count is not over five, a return (step 1122) to the main loop (FIG. 4) is effected. If the error count in EMPTNS counter 182 is greater than five, wash flag 132 is set (step 1124) prior to effecting a return (step 1126) to the main loop (FIG. 4).

If, however, the error flag 130 is not set, a control edge is defined (step 1128) in accordance with the procedure described in conjunction with FIGS. 10 and 10A. Since locked flag 118 is set in this instance, the defined control edge procedure of FIGS. 10–10A returns the indicia of the control edge stored in MAXMAG register 170 and the address of the control edge stored in MAXADR register 172.

After the control edge of the new signature has been defined, a comparison between the control edge of the respective indicia of the new pattern control edge and reference pattern control edge is effected (step 1130), to ensure that the control edges represent corresponding edges in the new pattern and reference pattern. Specifically, the signs (polarity) of the edge indicia stored in the MAXMAG register 170 (indicative of the control edge of the new pattern) and REFMAX register 124 are compared. Alternatively, all or an additional part, of the respective edge indicia stored in the MAXMAG and REFMAX registers 170, 124 can be compared and the difference tested against a predetermined threshold level. If the edges do not favorably compare, an error condition exists and the error count in the EMPTNS counter 182 is incremented (step 1118), and appropriate actions taken in accordance with the error count (steps 1120, 1122, 1124, 1126).

Assuming that the respective control edges correspond, the deviation in linear position between the new signature and the reference signature is determined. First, a determination is made as to whether the control edges of the new and reference patterns occur in the same sampling interval, and the difference in sampling intervals calculated. Specifically, recalling that the addresses of the edges correspond to particular points in the machine cycle, (i.e., particular sampling intervals) the difference in sampling interval of the respective control edges is determined by subtracting the respective addresses contained in the MAXADR register 172 and REFADR register 126. The sampling interval difference is stored (step 1132) in position error (POSERR) register 128.

A determination is then made as to whether the respective control edges of the new and reference patterns occurred in different quadrants of the sampling period, and the difference in quadrants calculated. The Q (quandrant) field of MAXMAG register 170 is subtracted (step 1134) from the Q field of REFMAX register 124, and the difference loaded into a designated register in RAM 46, e.g., delta register 154.

The sampling interval difference count is then adjusted to place the sampling interval and quadrant difference in equivalent terms, i.e., the sampling interval difference count is multiplied by a factor of four to express the difference in control edge sampling intervals in terms of sampling interval quadrants (step 1136). The quadrant difference in delta register 154 is then added (step 1138) to the sampling interval difference in POSERR register 128. The contents in POSERR register 128, i.e., the position error count, thus represents the difference in position between the control edges of the new and reference patterns to a resolution of one-quarter of a sampling interval.

After a position error indicia has been stored in POSERR register 128, it is apparent that no error or wash condition exists. Accordingly, the error and wash flags 130 and 132 are cleared (step 1140), and a return (step 1142) to the main loop effected.

As previously noted, a complete cross-correlation analysis 1101 is executed on a periodic basis (e.g., every thirtieth signature that is processed). The cross-correlation procedure is also executed in the event that (after a reference pattern is established) a preceding signature processed did not include any significant edges.

Referring now to FIG. 12, a suitable implementation of a cross-correlation analysis will be described. As previously noted, in order to save processing time, condensed data is used to compute the cross-correlation. Accordingly, the starting address of a NEWCOND array 184 in RAM 46 is loaded (step 1202) into address pointer 136, and the condense data routine (FIG. 6) is executed (step 1204). The provision of the starting address of the NEWCOND array 184 in address pointer 136 causes the condensed data to be stored in the first three hundred locations of NEWCOND array 184. As will be explained, the cross-correlation function of the new signature and reference pattern is to be calculated. However, the procedure of computing the cross-correlation function is greatly facilitated by generation of a continuum of the representation of the new pattern, i.e., the data in NEWCOND array 184. Specifically, to simplify the computation process it is desirable that the data representing the signature be preceded by the last twenty-five percent (25%) of the data, and followed by the first twenty-five percent (25%) of the data. However, conservation of memory space must be observed.

Accordingly, a NEWCOND array 184 continuum is established (step 1206). As will hereinafter be described more fully in conjunction with FIG. 13, the first section (i.e., first three hundred locations) of NEWCOND array 184 is duplicated in the next successive three hundred memory locations (NEWCOND section 2-184A). In addition, the first twenty-five percent, i.e., seventy-five locations of NEWCOND array 184 are duplicated in the seventy-five locations of NEWCOND section 3-184B, immediately following NEWCOND section 2-184A. The desired continuum is thus provided, beginning at the two hundred seventy-fifth location in NEWCOND array 184 (the beginning of the last quarter of the original condensed data).

The cross-correlation function of the condensed data representations of the new signature and reference pattern is then computed and stored in a CORFUN array 186 in RAM 46. The computation of the cross-correlation function will hereinafter be described in conjunction with FIG. 14.

After the cross-correlation function has been computed for the new data pattern, and stored in CORFUN array 186, the cross-correlation function element having the largest amplitude is determined, and the value and address of the maximum cross-correlation function element are stored (step 1208) in CORMAX register 188 and CORADR register 190, respectively. The procedure for identifying the largest amplitude cross-correlation function element will hereinafter be described in conjunction with FIG. 15.

After the maximum cross-correlation function element has been established, various tests are performed to ensure that the new signature in fact represents the same image as does the reference signature. First, the maximum amplitude of the cross-correlation function is tested to ensure that it is within the predetermined correlation boundaries (FIG. 7), i.e., within predetermined limits of the auto-correlation function of the reference pattern. Specifically, the maximum cross-correlation value stored in CORMAX register 188 is tested (step 1210) against the high threshold level stored in HIGHPT register 120 (the autocorrelation value of the reference pattern plus three percent). Assuming that the maximum cross-correlation value is not greater than the upper threshold, it is then tested (step 1212) against the low threshold value (the autocorrelation function of the reference pattern minus three percent) stored in LOWPT register 122. Assuming that the maximum cross-correlation value is within the predetermined limits, the respective corresponding elements of the OLDCOND and NEWCOND arrays 102 and 184 are compared (step 1214) to ensure that no significant differences between the signatures exists.

If the OLDCOND and NEWCOND arrays 102 and 184 compare favorably, the position offset of the new pattern from the reference pattern is determined. Since the maximum of an auto-correlation function corresponds to the center of the function (at which point each element is multiplied by itself, i.e., the auto-correlation function equals the sum of the squares of the elements), the position error can be determined by calculating the offset of the position of the maximum cross-correlation element from the array center. Thus, the difference between the address of the maximum cross correlation value stored in CORADR register 190 from the address of the center element (element 75) of the CORFUN array 186 is calculated (step 1216). The difference in address is indicative of the positional deviation of the new pattern from the reference pattern in units of eight sampling intervals. Accordingly, the difference is converted into units (sampling interval quadrants) equivalent to those provided by the high resolution error determination procedure described in conjunction with FIG. 11. The position difference count is therefore multiplied by a factor of 32 (step 1217), to provide a difference count in units of sampling interval quadrants, and stored in POSERR register 128. The procedure for determining the positional offset from the maximum cross-correlation element will hereinafter be more fully described in conjunction with FIG. 17.

The establishment of the positional error indicia in POSERR register 128 is indicative that no error or wash condition is present. Accordingly, the error and wash flags 130 and 132 are cleared (step 1218) and a return to the main loop (FIG. 4) is effected (step 1220).

If, however, it appears that the value of the maximum cross-correlation element contained in CORMAX register 188 is not within the HIGHPT 120 and LOWPT 122 limits (steps 1210, 1212) or that differences exist between corresponding elements of the OLDCOND and NEWCOND arrays 102 and 184, wash flag 132 is set (step 1222) and a return to the main loop (FIG. 4) is effected (step 1224).

Figure 13:
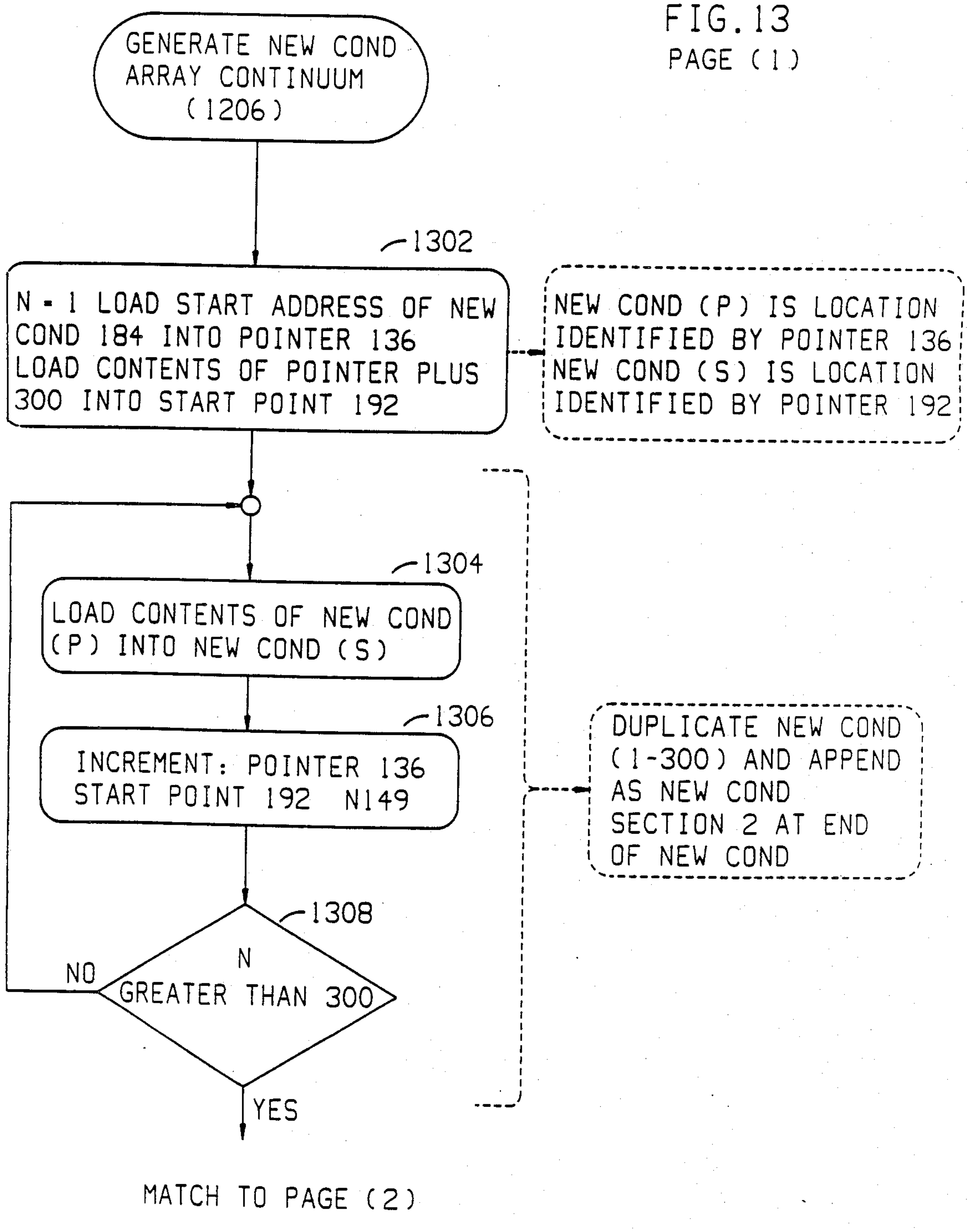

As previously noted, computation of the cross-correlation function is facilitated by generation of a continuum of data representing the new pattern (step 1206). Referring now to FIG. 13, generation of the NEWCOND array 184 continuum will be described.

The procedure is initiated (step 1302) by setting an N index (contents of N register 149) equal to one, loading the starting address of NEWCOND array 184 into address pointer 136, and loading the address of the three hundred first location of NEWCOND array 184, i.e., the address of the first location of the second section 184A of the NEWCOND array 184 (start address plus three hundred), into STARTPOINT register 192. Thus, address pointer 136 and STARTPOINT register 192 identify respective locations in the NEWCOND array 184, hereinafter referred to as NEWCOND(P) and NEWCOND(S), respectively.

The original condensed data in the first section, i.e., first three hundred locations of NEWCOND array 184 are duplicated in the second section of NEWCOND array 184 A by an iterative process. More specifically, the contents of the location identified by address pointer 136, NEWCOND(P) is loaded (step 1304) into the location identified by STARTPOINT register 192, NEWCOND(S). Address pointer 136, STARTPOINT register 192 and the N register 149 are each incremented (step 1306), and then N register 149 compared (step 1308) against three hundred. If the contents of N register 149 are not greater than three hundred, the procedure beginning with step 1304 is repeated for the next successive NEWCOND(P) and NEWCOND(S) locations.

Once three hundred iterations have been completed, duplicating the original condensed data stored in the first section of NEWCOND 184, the first seventy-five locations (first quarter) of the original condensed data stored in NEWCOND 184 are duplicated in NEWCOND section 3-184B. Accordingly, STARTPOINT register 192 is incremented to designate the first location in the third section NEWCOND 184B (the location immediately following the last location of the second section of NEWCOND 184A. Address pointer 136, however, is reloaded with the starting address of the NEWCOND array 184, and N register 149 is reset to one (step 1310). The contents of the location designated by address pointer 136, NEWCOND(P) is then loaded (step 1312) into the location identified by STARTPOINT register 192, NEWCOND(S) for seventy-five iterations. That is, after the initially designated registers are operated upon, address pointer 136, STARTPOINT register 192 and N register 149 are each incremented (step 1314). The contents of N register 149 are then tested against seventy-five (step 1316), and if not greater than seventy-five, the operation is repeated on the next successive NEWCOND(P) and NEWCOND(S) elements.

Once seventy-five iterations have been completed, STARTPOINT register 192 is loaded (step 1318) with the address of the beginning of the continuum, that is, the address of the location beginning the last quarter (seventy-five locations) of the original condensed data stored in NEWCOND (NEWCOND (275)), and a return (step 1320) to the cross-correlation analysis of FIG. 12 is effected. Thus, the continuum of data beginning with the last seventy-five condensed data elements, followed by the full array of condensed data elements which are in turn followed by the first quarter of the data elements is generated in NEWCOND array 184, beginning at the location identified in STARTPOINT register 192.

Figure 14:
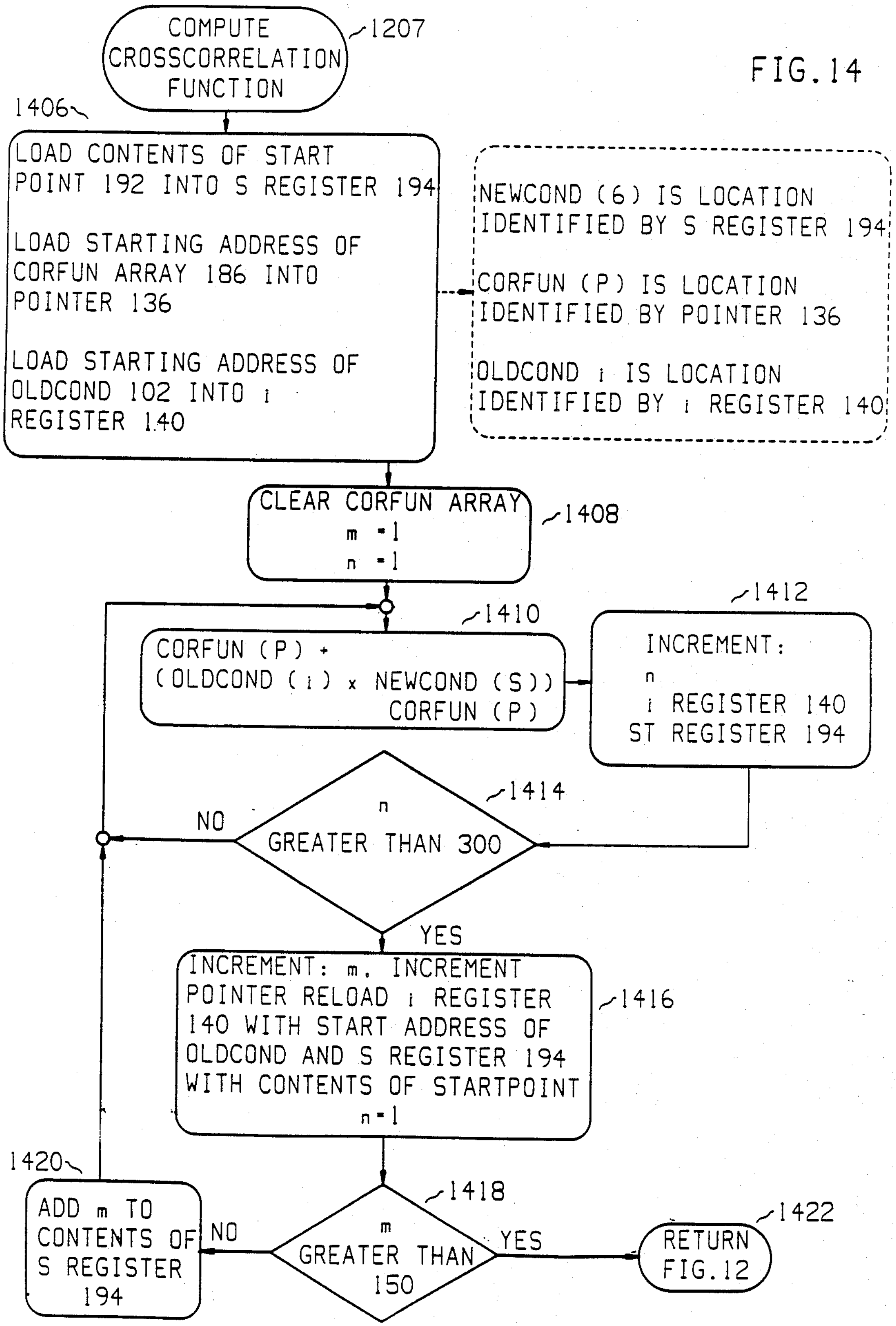

Referring now to FIG. 14, the procedure for computing the cross-correlation function 1206 will be described.

The process is initiated (step 1406) by loading the address of the beginning of the NEWCOND continuum, i.e., the contents of STARTPOINT register 192, into a designated register in RAM 46, e.g., S register 194, the starting address of the OLDCOND array 102 into the I register 140, and the starting address of the CORFUN array 186 (in which the cross-correlation elements are to be stored) into address pointer 136. Thus, the contents of S register 194, I register 140, and address pointer 136, identify the particular elements of NEWCOND 184, OLDCOND 102, and CORFUN 186 to be operated upon.

In addition, CORFUN array 186 is initially cleared, and respective indexes M and N (the contents of M register 148 and N register 149 in RAM 46) are each set to one (step 1408).

The respective elements of the correlation function are then calculated. The cross-correlation function of the NEWCOND and OLDCOND arrays 102 and 184 is as follows:

$$\mathrm{CORFUN}_m = \sum_{i=1}^{300} \mathrm{OLDCOND}_i \times \mathrm{NEWCOND}_{i+m} \text{ FOR } m = 0 \text{ to } 149 \quad (2)$$

This is effected as follows: The contents of the location in OLDCOND array 102 identified by I register 140 (OLDCOND(I)) and the contents of the location in NEWCOND array 184 identified by S register 194 (NEWCOND(S)) are multiplied, and the products accumulated and stored in CORFUN(P) (step 1410).

N register 149, I register 140 and S register 194 are each then incremented (step 1412), and the contents of N register 149 compared (step 1414) against three hundred. If N register 149 is not greater than three hundred, the CORFUN(P) calculation is reiterated with respect to the next successive locations in NEWCOND 184 and OLDCON 102, as identified by the contents of S register 194 and I register 140, respectively.

Once three hundred iterations of the CORFUN(P) calculations have been completed, (i.e., the contents of N register 149 are greater than three hundred), M register 148 and address pointer 136 are incremented, I register 140 is reloaded with the starting address of OLDCOND array 102, S register 194 is reloaded with the contents of STARTPOINT register 192, and the N register 149 is reset to one (step 1416). The contents of M register 148 are then compared against one hundred fifty (step 1418). If the contents of M register 148 are not greater than one hundred fifty, the contents of the S register 194, (identifying the particular NEWCOND array 184 element to be operated on) is increased (step 1420) by the value of M register 148, such that the first element of NEWCOND array 184 operated upon in respect of each successive CORFUN array 186 element is shifted by one. The process is then reiterated for the next successive CORFUN array 186 element (identified by address pointer 136).

Once one hundred fifty iterations have been completed, i.e., all one hundred fifty elements of CORFUN array 186 have been calculated, a return (step 1422) to FIG. 12 is effected.

Figure 15:
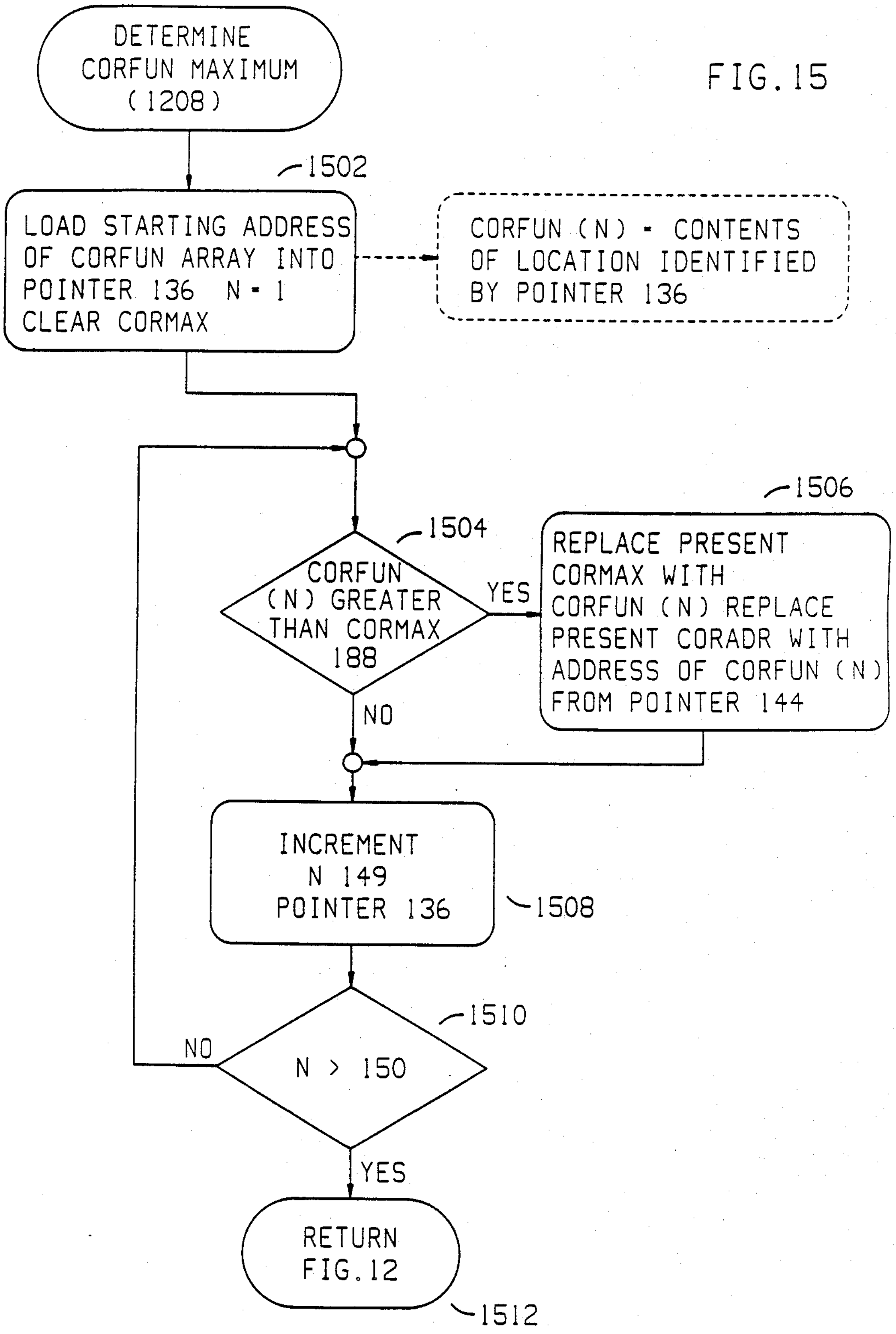

As previously noted, the cross-correlation analysis described in conjunction with FIG. 12, entails determining the value and address of the cross-correlation function element having the largest amplitude, and storing the value and address thereof in CORMAX register 188 and CORADR register 190, respectively. Referring now to FIG. 15, such process will be more fully described. The process is initiated (step 1502) by loading the starting address of CORFUN array 186 into address pointer 136, clearing CORMAX register 188, and setting a designated register, e.g., N register 149, to one. A comparison (step 1504) is then made of the contents of the location identified by address pointer 136 (CORFUN) and the contents of CORMAX register 188 (initially zero).

If the contents of the COFUN array 186 element identified by address pointer 136 is greater than the present contents of CORMAX register 188, CORMAX register 188 is loaded with CORFUN(N) replacing its previous contents, and CORADR register 190 is loaded with the address of CORFUN(N) from address pointer 136 (step 1506).

After the new CORMAX register 188 value has been established, or, after it has been established that the present CORFUN(N) value is not greater than the present CORMAX register 188 value, the N register 149 and address pointer 136 are each incremented (step 1508), and the contents of N register 149 are compared against one hundred fifty (step 1510). If the contents of N register 149 are not greater than one hundred fifty, the comparison procedure is repeated for the next successive location of CORFUN array 186 as identified by address pointer 136. Thus, each element of the cross-correlation array is compared against the previous maximum so that at the end of one hundred fifty iterations, CORMAX register 188 contains the largest amplitude value of the cross-correlation function, and CORADR register 190 contains the address of that element. Once the procedure has been reiterated one hundred fifty times, such that each element of the CORFUN array 186 has been compared to CORMAX register 188, a return (step 1512) to FIG. 12 is effected.

Figure 16:
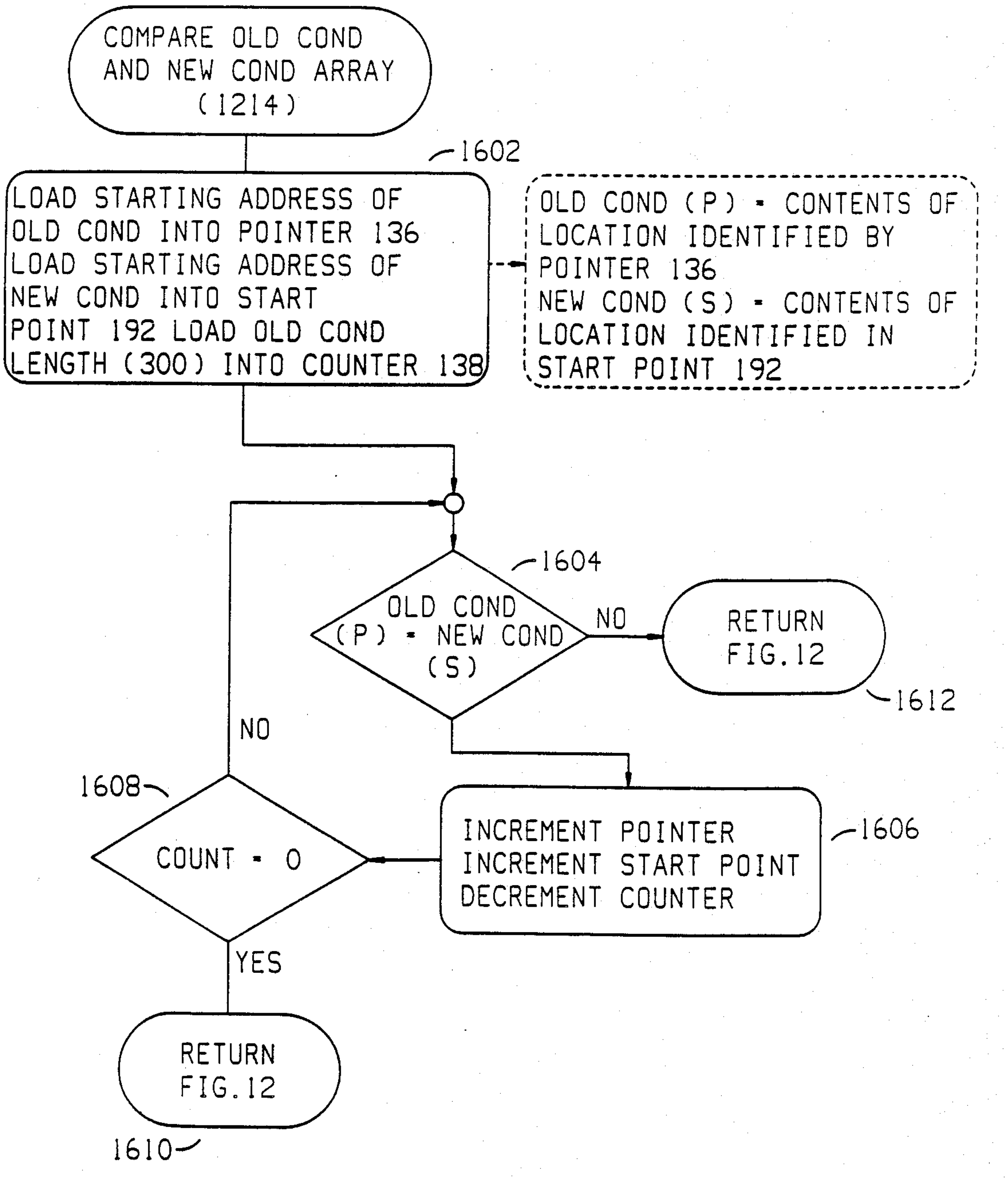

As previously noted, the cross-correlation analysis (FIG. 12) entailed the step of comparing the condensed data of the new and reference patterns in the OLDCOND and NEWCOND, arrays 102 and 184. Referring now to FIG. 16, such procedure will be more fully described. The procedure is initiated (step 1602) by loading the starting addresses of the OLDCOND array 102 and NEWCOND array 184 into address pointer 136 and STARTPOINT register 192, respectively. The length of the data array (three hundred) is loaded into counter 138.

The contents of the memory location identified by address pointer 136, OLDCOND(P) is compared (step 1604) against the contents of the corresponding location in NEWCOND array 184, identified in STARTPOINT register 192, NEWCOND(S). If OLDCOND(P) is found to be equal to the corresponding element NEWCOND(S), address pointer 136 and STARTPOINT register 192 are incremented, and counter 138 decremented (step 1606) the contents of counter 138 are then compared (step 1608) against zero to determine whether each element of the respective arrays has been compared. If the count is not equal to zero, the next successive OLDCOND(P) and NEWCOND(S) elements, as identified by the contents of address pointer 136 and STARTPOINT register 192 are compared. Once the process has been reiterated three hundred times so that each corresponding element in the OLDCOND 102 and NEWCOND 184 arrays has been compared, a return (step 1610) to FIG. 12 is effected.

If, however, any of the corresponding OLDCOND(P) and NEWCOND(S) elements are found not to be equal, an immediate return (step 1612) to FIG. 12 is effected, whereupon wash flag 132 is set (step 1222) and a return (step 1224) from the cross-correlation routine is made to the main loop (FIG. 4).

Figure 17:
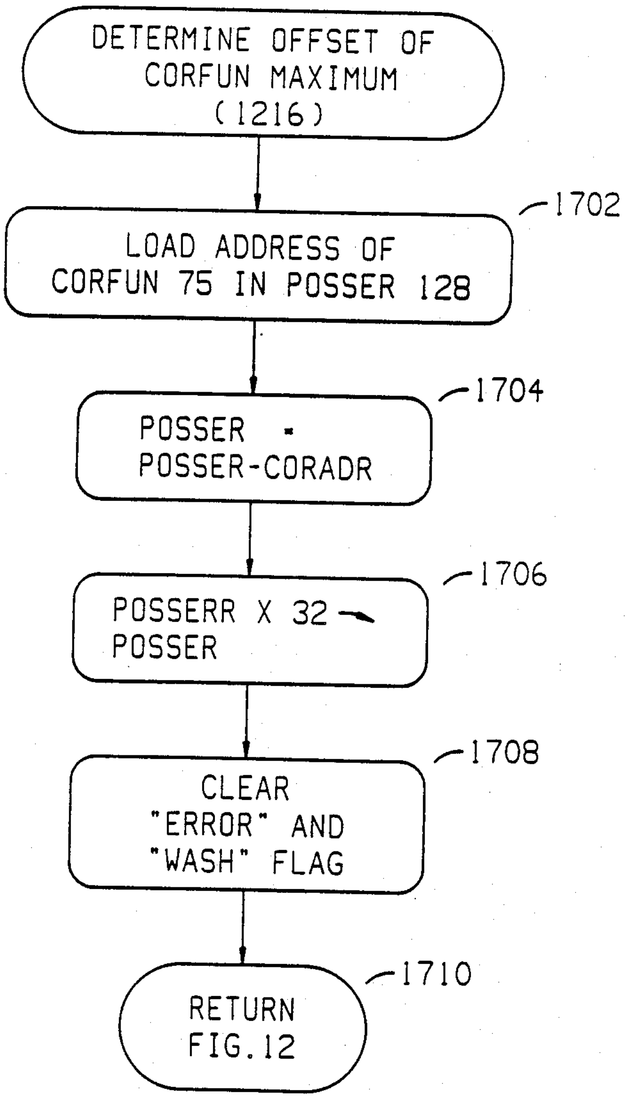

As previously noted, the cross-correlation analysis 1101 described in conjunction with FIG. 12, entails the step of determining the positional deviation of the new pattern from the reference pattern by comparison of the address of the maximum cross-correlation element to the address of the center point of the cross-correlation function (i.e., the address corresponding to the maximum auto-correlation function of the reference pattern) Referring to FIG. 17, such procedure will be described. The procedure is initiated (step 1702) by loading the address of the central element of the cross-correlation array (the seventy-fifth element of CORFUN array 186) into POSERR register 128. The address of the maximum cross-correlation element, i.e., the contents of CORADR register 190, is then subtracted from the central address in POSERR register 128, and the difference loaded back into POSERR register 128 (step 1704). Thus, POSERR register 128 contains the difference between the center address and the address of the maximum cross-correlation element. However, since the computation is done utilizing data condensed by a factor of eight, the difference in POSERR register 128 is multiplied by thirty-two (32) (step 1706), so that the contents of POSERR 128 represent the postitional error in units of one quarter sampling intervals. Error and wash flags 130 and 132 are then cleared, and a return (step 1710) to FIG. 12 effected.

Figure 18:
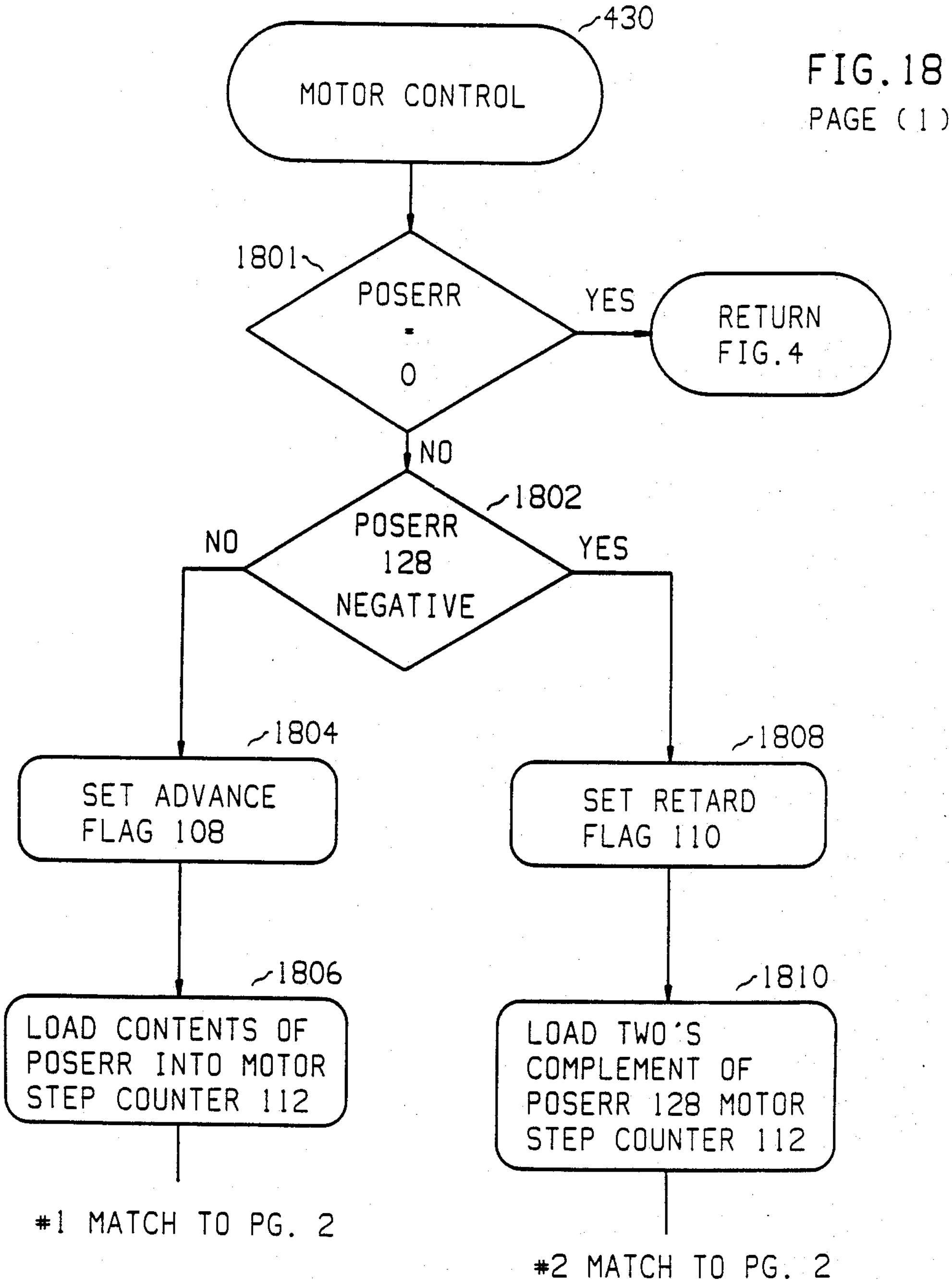
Figure 18:
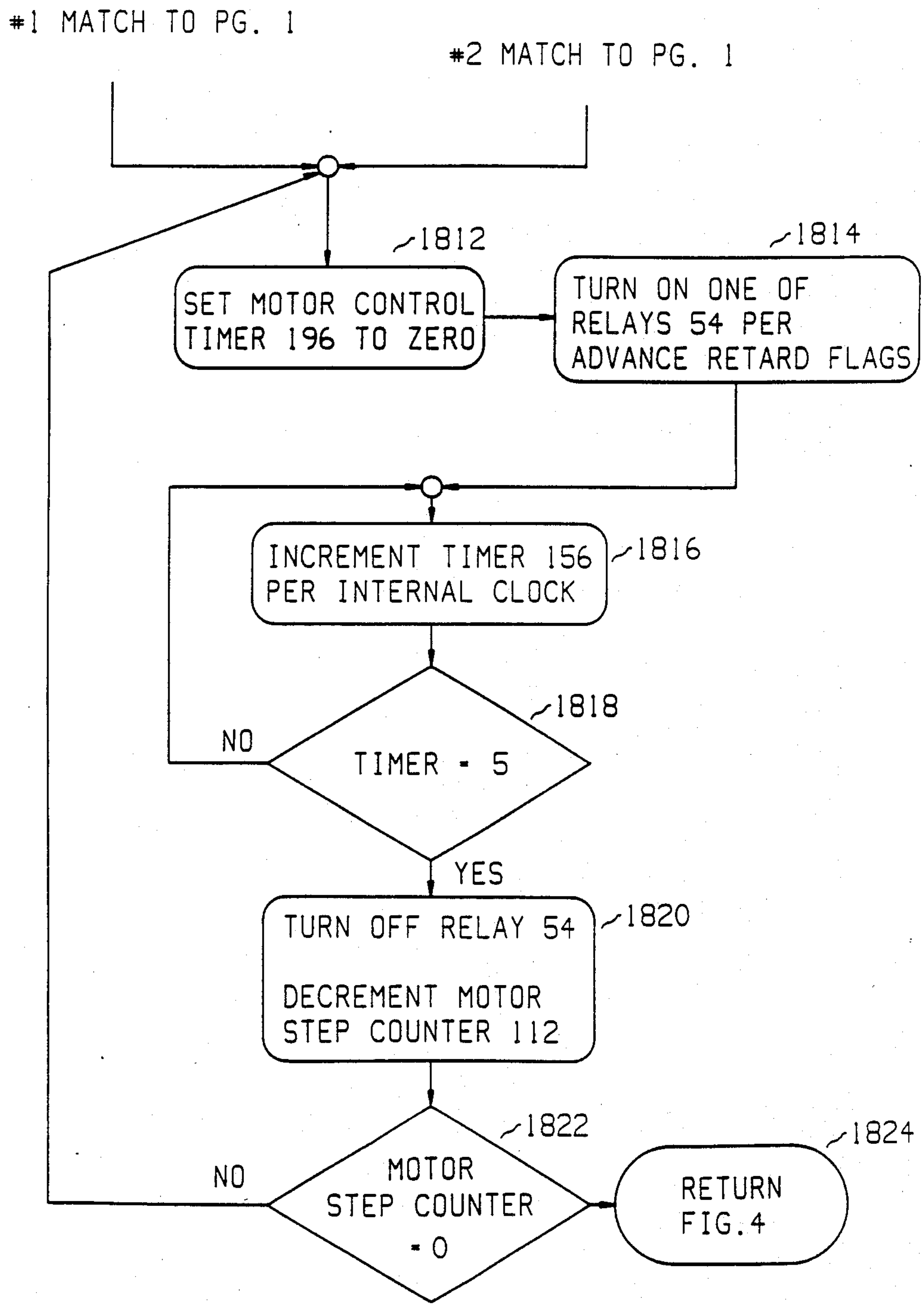

As previously noted, in respect of the main loop described in conjunction with FIG. 4, after the error computation routine 424 has been executed and a determination has been made that none of the error, wash and speedcheck flags 130, 132 and 134 have been set, a motor control procedure 430 is effected to selectively actuate compensation motor 30 and vary the linear web path length to compensate for the detected position error. Referring now to FIG. 18, the motor control procedure 430 will be more fully described.

The procedure is initiated by first testing the contents of POSERR register 128 (step 1801). If the contents of POSERR register 128 are zero, an immediate return is effected to FIG. 4.

A determination as to the direction of change, i.e., advance or retard, is then made. The sign of the position error indicia in POSERR register 128 is tested (step 1802). If the contents of POSERR register 128 are positive, advance flag 108 is set (step 1804) and the contents of POSERR 128 loaded into automatic motor step counter 112 (step 1806). If, however, the contents of POSERR register 128 are negative, retard flag 110 is set (step 1808), and the two's complement representation of the contents of POSERR register 128 is loaded into automatic motor step counter 112.

A signal is then generated to actuate one of relays 54 in accordance with the advance and retard flags 108 and 110 for a period of time corresponding to the contents of the automatic motor step counter 112. Specifically, for each count in automatic motor step counter 112, compensation motor 30 is activated for a period of time corresponding to an adjustment of one-quarter sampling interval. A motor control timer 196 is initially cleared to zero (step 1812), and the appropriate relay 54 is turned on (step 1814). Timer 196 is then incremented (step 1816) by an internal clock until it reaches a predetermined count, e.g., five (step 1818) corresponding to the desired unit adjustment period. Relay 54 is then turned off and automatic motor step counter 112 is decremented (step 1820). The contents of automatic motor step counter 112 are then tested against zero (step 1822) and, if not equal to zero, the foregoing process is repeated. Once automatic motor step counter 112 reaches zero, the relay 54 has been actuated for a time period corresponding to the position error count, and a return (step 1824) to FIG. 4 is effected.

It should be appreciated that system 10 provides a particularly advantageous mechanism and process for synchronizing and maintaining the linear position of a moving web with respect to a cyclical machine operation.

It will be understood that while various of the conductors/connectors are depicted in the drawings as single lines, they are not so shown in a limiting sense and may comprise plural conductors/connectors as is understood in the art. Further, the above description is of a preferred exemplary embodiment of the present invention and the invention is not limited to the specific form shown. For example, while the system was described as using separate registers in connection with individual indexes or variables, a single register may be utilized at different times during the course of the program to contain a plurality of variables and/or indexes. Likewise, algorithms other than those described for effecting the various analyses or functions described, or different implementations of the algorithms may be utilized. These and other modifications may be made in the design and arrangement of the elements without departing from the spirit of the invention as expressed in the appended claims.

What is claimed is:

1. A system for relating a cyclical machine operation to the position of images on a web moving along a web path, by generating control signals to adjustment means for varying said machine operation relative to said moving web in accordance with said control signals, said system comprising:

means for generating, for successive machine operation cycles, indicia of variations in density of the image at respective sampling intervals related to the machine operation cycle throughout a substantial portion of said image;

means for selectively generating, from a first image indicia associated with a first machine operation cycle, reference pattern indicia;

means for selectively generating, from a successive image indicia associated with a successive machine operation cycle, successive pattern indicia; and means for generating said control signals to said adjustment means to vary said machine operation relative to said moving web in accordance with differences between said reference pattern indicia and said successive pattern indicia.

2. The system of claim 1, wherein said means for generating image indicia comprises:

a scanner for generating an image signal representative of the density of the image on said web at a point a constant distance along said web path from said machine operation;

means for generating successive image data bytes indicative of the value of said image signal during predetermined increments of said machine operation cycle, the image data bytes corresponding to a predetermined number of consecutive increments of a machine operation cycle comprising said image indicia associated with said machine operation cycle; and storage means for selectively storing said successive image data bytes in accessible storage locations corresponding to said predetermined increments of said machine operation cycle.

3. The system of claim 1, wherein said means for selectively generating reference pattern indicia comprises:

means for generating, from said first image indicia, indicia of the point of greatest change in said image during said first machine operation cycle.

4. The system of claim 3, wherein said means for selectively generating said successive pattern indicia comprises:

means for generating, from said successive image indicia, indicia of the point of greatest change in said image during said successive machine operation cycle.

5. The system of claim 1, wherein said means for selectively generating said successive pattern indicia comprises:

means for generating, from said successive image indicia, indicia of the point of greatest change in said image during said successive machine operation cycle.

6. The system of claim 1, wherein said means for selectively generating reference pattern indicia comprises:

means for generating, from said first image indicia, indicia of the maximum of the auto-correlation function of said first image indicia.

7. The system of claim 1, wherein said means for selectively generating successive pattern indicia comprises:

means for generating indicia of the maximum of the cross-correlation of said first image indicia and said second image indicia.

8. A system for relating a cyclical machine operation to the position of images on a web moving along a web path by generating control signals to adjustment means for varying said machine operation with respect to the moving web in accordance with said control signals, said system comprising:

means for generating successive image signatures corresponding to successive machine operation cycles, said signatures being indicative of variations in density of said image over the course of the corresponding machine operation cycle;

means for selectively generating, from a first image signature corresponding to a first machine operation cycle, indicia of the point of greatest change in said first image signature;

means for selectively generating, from a successive image signature corresponding to a successive machine operation cycle, indicia of the point if greatest change in said successive image signature;

means for generating said control signal to said adjustment means in accordance with a comparison of said first image and second image points of greatest change.

9. The system of claim 8 wherein said means for generating successive image signatures comprises means for generating indicia of the density of said image at a point on said web a constant distance from said machine operation at respective sampling intervals during the corresponding machine operation cycle.

10. A web-fed printer comprising:

drive means for moving a web along a path;

image generating means, disposed along said path, for repetitively generating an image on a substantial portion of said web;

a cutting apparatus, disposed along said path, for periodically cutting said web;

adjustment means, responsive to control signals applied thereto, for controllably varying the effective relative position along said path of said cutting apparatus from said image generating means;

digital signature generator means for generating, for successive periods of said cutting apparatus, successive image signatures, said image signatures being indicative of the variations in the density of the image on said web at a point along said path between said adjustment means and said cutting apparatus at successive incremental sampling intervals related to the corresponding cutting apparatus period;

means for selectively generating from an image signature in respect of a first cutting apparatus period, reference pattern indicia;

means for selectively generating from an image signature in respect of a successive cutting apparatus period, successive pattern indicia; and means, responsive to said reference pattern indicia and said successive pattern indicia, for selectively generating said control signals to said adjustment means.

11. The printer of claim 10, wherein said means for selectively generating reference pattern indicia comprises:

means for selectively generating, from said first image signature, indicia of the point of greatest change in said image during said first cutting apparatus period; and said means for selectively generating successive pattern indicia comprises:

means for selectively generating, from said successive image signature, indicia of the point of greatest change in said image during said successive cutting apparatus period; and said means for generating control signals to said adjustment means comprises:

means for selectively generating control signals to said adjustment means in accordance with differences in the points of greatest change in said first image signature and said successive image signature.

12. A system for generating control signals to adjustment means for varying the relation of a cyclical machine operation to a web moving along a path in accordance with the position of a repetitive image, said image being disposed on a substantial portion of said web during said cyclical machine operation, said system comprising:

means for generating image signals indicative of variations in density of said image on said web as related to successive machine operations;

means, responsive to said image signals, for generating reference indicia, indicative of the position of said image relative to a first machine cycle;

means, responsive to said image signals, for generating successive indicia, indicative of the position of said image relative to a successive machine operation cycle; and means, responsive to said reference indicia and said successive indicia, for generating said control signals in accordance with deviations in the position of said image relative to said successive machine operation cycle from the position of said image relative to said first machine cycle.

13. The system of claim 12 wherein said means for generating reference indicia comprises:

means for generating indicia of the point in said first machine cycle corresponding to a point of greatest change in density of said image.

14. The system of claim 13 wherein said means for generating successive indicia comprises:

means for generating indicia of the point in said successive machine cycle corresponding to a point of greatest change in density of said image.

15. The system of claim 12 wherein:

said means for generating reference indicia comprises means for generating a reference pattern array, the elements of said reference pattern representing the density of said image at respective sampling points in said first machine cycle;

said means for generating said successive indicia comprises means for generating a successive pattern array, the elements of said successive pattern representing the density of said image at respective sampling points in said successive machine cycle;

said means for generating said control signals comprises means for determining the maximum of the cross-correlation of said reference pattern and successive pattern array, and generating said control signals in accordance with the deviation of said maximum from the center of said cross-correlation function.

16. The system of claim 15 wherein said cyclical machine operation is a cutting operation.

17. A method for relating a cyclical machine operation to repetitive images on a moving web, said machine operation having associated therewith adjustment means, responsive to control signals applied thereto, for varying the relationship of said operation to said web, said method comprising the steps of:

generating image data bytes indicative of variations in density of said images in relation to individual cycles of said machine operation;

storing, as indicia of a reference pattern, a first set of said image data bytes corresponding to a first machine cycle;

storing, as indicia of a new pattern, a second set of image data bytes corresponding to a successive machine cycle;

generating indicia of respective coefficients of the cross-correlation function of said new pattern with said reference pattern; and generating said control signals to said adjustment means in accordance with said cross-correlation function.

18. The method of claim 17, wherein said step of generating control signals comprises:

generating indicia of a maximum value in said cross-correlation function; and generating said control signals in accordance with the deviation of said maximum value from the center of said cross-correlation function.

19. The method of claim 17 wherein said machine operation is a cutting operation effected by a cutting apparatus and said generating control signal step comprises generating control signals to said adjustment means to vary the effective position of said cutting apparatus along said web.

20. A method for relating a cyclical machine operation to images on a moving web, said operation having associated therewith adjustment means, responsive to control signals applied thereto, for varying the relationship of said operation to said web, said method comprising the steps of:

(a) generating sequential data bytes indicative of said image, said data bytes corresponding to incremental advancements in said machine operation cycle;

(b) storing a first set of bytes, including at least one byte corresponding to each incremental advancement in a first machine operation cycle, in predetermined sequential memory locations, as a reference pattern array, indicative of a reference pattern;

(c) storing a second set of bytes, including at least one byte corresponding to each incremental advancement in a second machine operation cycle, in predetermined sequential memory locations, as a new pattern array, indicative of a new pattern;

(d) expanding one of said arrays, step (d) comprising the steps of:

copying a beginning portion of said array into sequential memory locations immediately following the set of sequential locations associated with said array;

copying an end portion of said array into sequential memory locations just preceding said set of sequential locations associated with said array;

(e) generating successive coefficient indicia corresponding to the sum of products of associated elements of said new pattern array and said reference pattern array, as the arrays are incrementally shifted in position relative to each other, to generate indicia of the cross-correlation function of said new pattern and said reference pattern; and (f) generating said control signals to said adjustment means in accordance with said cross-correlation function.

* * * * *